US010702969B2

(12) United States Patent
Smith et al.

(10) Patent No.: US 10,702,969 B2
(45) Date of Patent: Jul. 7, 2020

(54) ACTUATOR TILT INTERPOSER FOR WITHIN-ROW LAPPING MOUNT TOOL FOR MAGNETIC RECORDING READ-WRITE HEADS

(71) Applicant: Western Digital Technologies, Inc., San Jose, CA (US)

(72) Inventors: Darrick T. Smith, San Jose, CA (US); Glenn P. Gee, San Jose, CA (US); Hicham M. Sougrati, Elk Grove, CA (US); Damaris Davis, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 361 days.

(21) Appl. No.: 15/847,805

(22) Filed: Dec. 19, 2017

(65) Prior Publication Data

US 2018/0185978 A1 Jul. 5, 2018

Related U.S. Application Data

(63) Continuation-in-part of application No. 15/190,859, filed on Jun. 23, 2016, now Pat. No. 9,881,639.

(51) Int. Cl.
*B24B 37/04* (2012.01)
*B24B 37/20* (2012.01)
*G11B 5/31* (2006.01)

(52) U.S. Cl.
CPC ............ *B24B 37/048* (2013.01); *B24B 37/20* (2013.01); *G11B 5/3163* (2013.01); *G11B 5/3169* (2013.01); *G11B 5/3173* (2013.01)

(58) Field of Classification Search
CPC ..... B24B 37/048; B24B 37/20; G11B 5/3163; G11B 5/3169; G11B 5/3173
(Continued)

(56) References Cited

U.S. PATENT DOCUMENTS 3,170,271 A 2/1965 Unterbrink et al.
3,423,885 A 1/1969 Crandall
(Continued)

FOREIGN PATENT DOCUMENTS

JP 2001236611 A 8/2001
JP 2008279515 A 11/2008

OTHER PUBLICATIONS

International Search Report and Written Opinion for counterpart PCT/US2017/037537, dated Sep. 11, 2017, 11 pages, EPO/ISR.
(Continued)

*Primary Examiner* — George B Nguyen
(74) *Attorney, Agent, or Firm* — John D. Henkhaus

(57) ABSTRACT

A lapping tool assembly includes a mount tool and an interposer structure interposed between actuators and the mount tool, where the interposer includes interposer pins reactively coupled with the actuators such that each interposer pin is configured to receive a translational force from a corresponding actuator and to transmit the force to a corresponding actuation pin of the mount tool. The interposer may include a zero z-axis shift flexure system, and/or a z-axis decoupling flexure system, and/or alignment features, for accurately transmitting the actuation forces to the mount tool, while inhibiting affecting other portions of the mount tool.

15 Claims, 25 Drawing Sheets

(58) Field of Classification Search
USPC .......................................................... 451/11
See application file for complete search history.

(56) References Cited

U.S. PATENT DOCUMENTS

| | | | |
|---|---|---|---|
| 4,517,041 A | 5/1985 | Hennenfent et al. |
| 5,203,119 A | 4/1993 | Cole |
| 5,266,769 A | 11/1993 | Deshpande et al. |
| 5,607,340 A | 3/1997 | Lackey et al. |
| 5,951,371 A | 9/1999 | Hao |
| 6,045,431 A | 4/2000 | Cheprasov et al. |
| 6,093,083 A | 7/2000 | Lackey |
| 6,287,170 B1 | 9/2001 | Hao et al. |
| 6,346,029 B1 | 2/2002 | Church et al. |
| 6,390,905 B1 | 5/2002 | Korovin et al. |
| 6,447,367 B1 | 9/2002 | Kozu et al. |
| 6,568,992 B1 | 5/2003 | Angelo et al. |
| 6,857,937 B2 | 2/2005 | Bajorek |
| 6,884,148 B1 | 4/2005 | Dovek et al. |
| 7,438,628 B2 | 10/2008 | Kundig |
| 7,634,850 B2 | 12/2009 | Tanaka |
| 8,254,057 B1 | 8/2012 | Hattori et al. |
| 8,390,962 B2 | 3/2013 | Gunder et al. |
| 8,614,863 B2 | 12/2013 | Fujii et al. |
| 9,881,639 B2 * | 1/2018 | Davis .................. G11B 5/1278 |
| 2001/0055933 A1 | 12/2001 | Shindou et al. |
| 2002/0077044 A1 | 6/2002 | Shindo et al. |
| 2006/0168798 A1 | 8/2006 | Naka |
| 2007/0070543 A1 | 3/2007 | Gunder et al. |
| 2008/0022510 A1 | 1/2008 | Tanaka |
| 2008/0072418 A1 | 3/2008 | Kondo et al. |
| 2008/0102733 A1 | 5/2008 | Harter |
| 2015/0099426 A1 | 4/2015 | Ronshaugen et al. |

OTHER PUBLICATIONS

International Search Report and Written Opinion for counterpart PCT/US2018/052741, dated Jan. 11, 2019, 11 pages, KIPO ISA/KR.

* cited by examiner

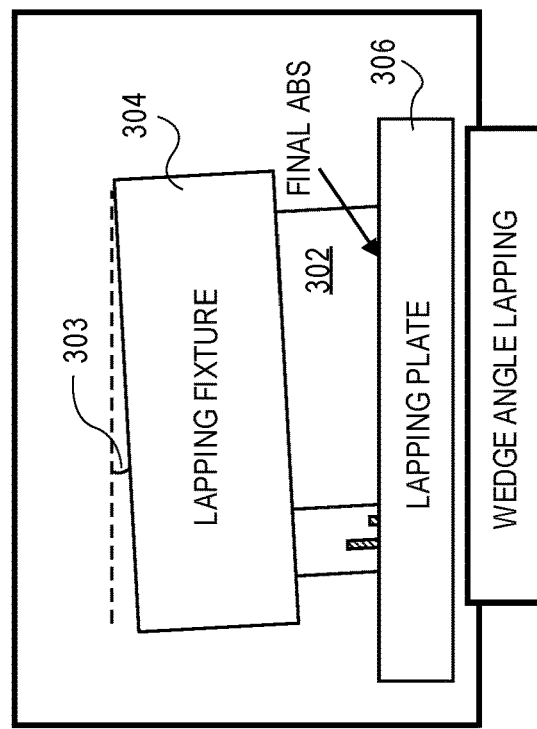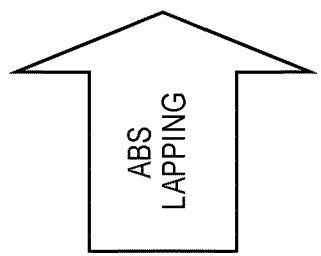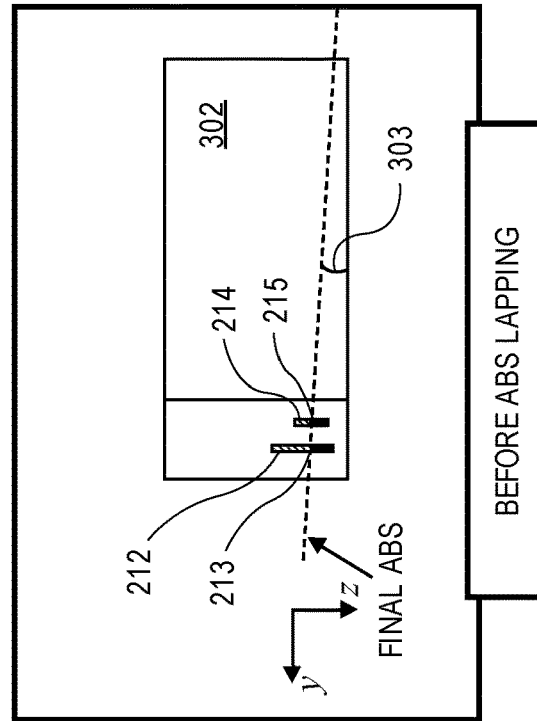
FIG. 3

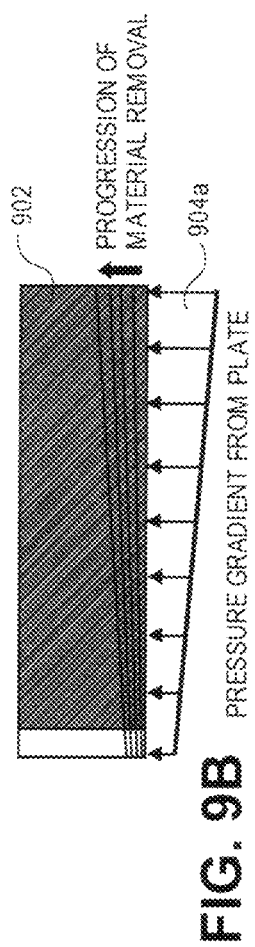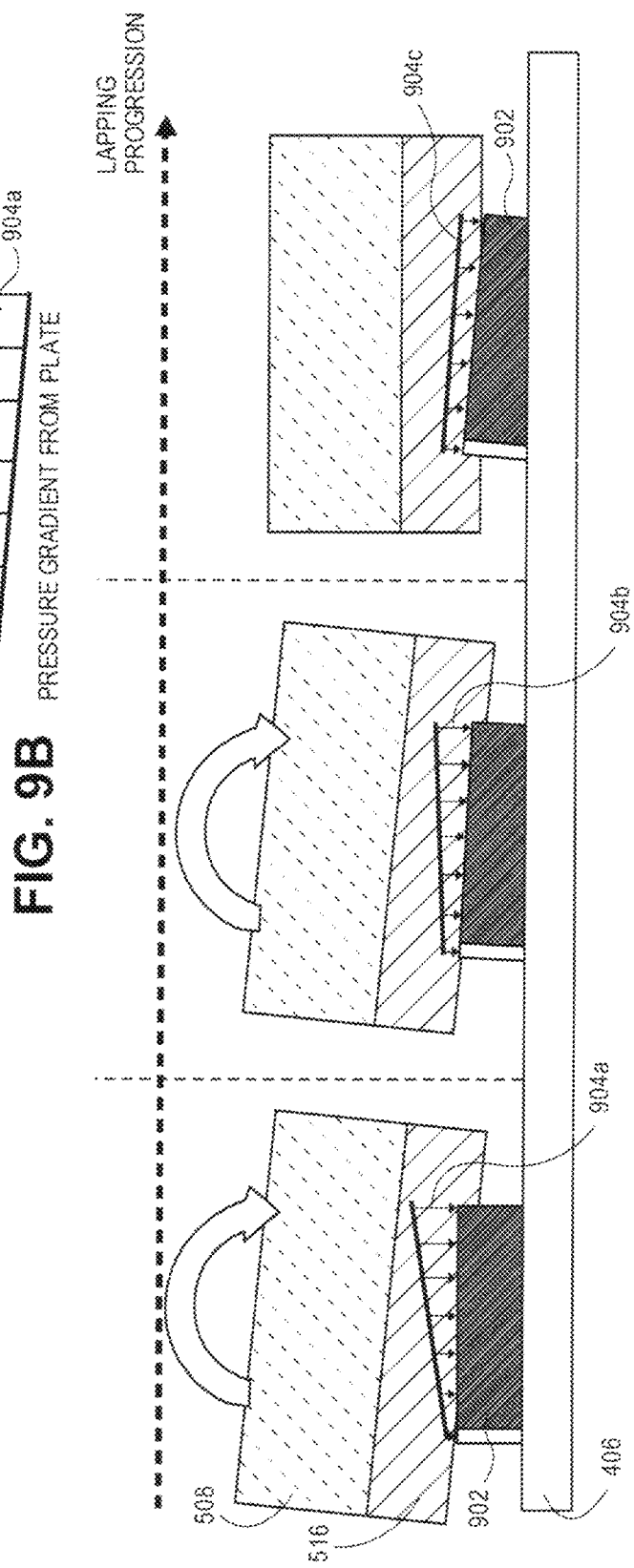
FIG. 9B
FIG. 9A

ACTUATOR TILT INTERPOSER FOR WITHIN-ROW LAPPING MOUNT TOOL FOR MAGNETIC RECORDING READ-WRITE HEADS

CROSS-REFERENCE TO RELATED APPLICATIONS

This application is a continuation-in-part of and claims the benefit of priority to U.S. patent application Ser. No. 15/190,859 filed on Jun. 23, 2016, now issued as U.S. Pat. No. 9,881,639, the entire content of which is incorporated by reference for all purposes as if fully set forth herein.

FIELD OF EMBODIMENTS

Embodiments of the invention may relate generally to magnetic recording devices and more particularly to controlling the element stripe height and wedge angle within a row-bar.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

High volume magnetic thin film head slider fabrication involves high precision subtractive machining performed in discrete material removal steps. Slider processing starts with a completed thin film head wafer consisting of 40,000 or more devices, and is completed when all the devices are individuated and meet numerous and stringent specifications. Each individual device ultimately becomes a read-write head (e.g., Perpendicular Magnetic Recording (PMR) heads) for flying over a spinning disk.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. Precise control of the critical dimensions of a read head element and a write head element, by way of machining and lapping, are commonly practiced and are a necessity of manufacturing. Of continued importance is the alignment of the read and write portions of the head relative to each other. For optimum yield, performance and stability, precise dimensional control over both the reader and/or writer elements is desirable.

For example, process improvements regarding the magnetic core width (MCW) (as well as the magnetic erase width (MEW), magnetic write width (MWW), magnetic interference width (MIW), and other related magnetic core measures) would benefit areal density because the MCW effectively determines the width of a magnetic bit recorded by the write head. Furthermore, the single largest contributor to the overall MCW sigma is typically the "within row-bar" sigma. Even though manufacturing processes are developed to produce read-write heads having MCW as close as possible to a desired MCW for the system, some thin-film and other manufacturing processes (e.g., lithography, etching, rough lapping, material elasticity, etc.) experience inherent variations that make it quite challenging to achieve the desired MCW for every read-write head manufactured.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3 is a diagram illustrating a wedge angle lapping (WAL) process;

FIG. 7A is a cross-sectional side view illustrating a fixture of the lapping tool of FIG. 7, according to an embodiment;

FIGS. 9A, 9B are diagrams illustrating a "soft" bond WA lapping process, according to an embodiment;

DETAILED DESCRIPTION

Approaches to lapping a row-bar of magnetic sensors, utilizing a lapping tool assembly, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of a read-write head for a digital data storage device such as a hard disk drive (HDD). Thus, in accordance with an embodiment, a plan view illustrating an HDD 100 is shown in FIG. 1 to illustrate an exemplary operating context.

Figure 1:
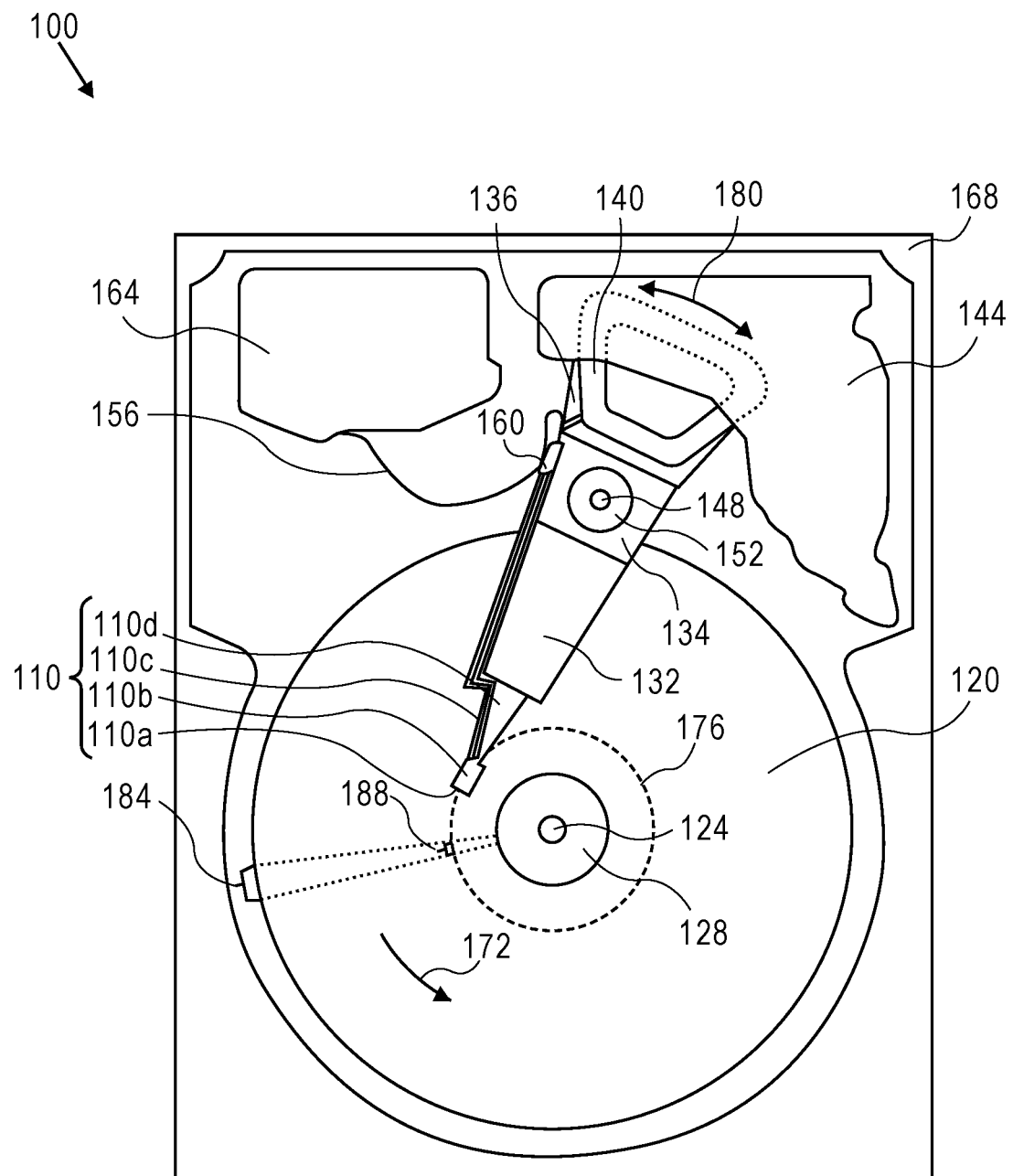
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As mentioned, the largest contributor to the overall magnetic core width (MCW) sigma is typically the "within row-bar" sigma, and even though manufacturing processes are developed to produce read-write heads having an MCW as close as possible to a target MCW, some thin-film processes experience inherent variations that make it an ongoing challenge to achieve the target MCW for every head manufactured.

Furthermore, high-volume magnetic thin film head slider fabrication involves high precision subtractive machining performed in discrete material removal steps. Slider processing starts with a completed thin film head wafer consisting of 40,000 or more devices, and is completed when all the devices are individuated and meet numerous and stringent specifications. The individual devices ultimately become head sliders housing a read-write head. Therefore, precise control of the reader dimension and of the alignment of the reader and writer relative to each other are critical components of the read-write head fabrication process, in order to achieve optimum yield, performance, and stability. In order to achieve ideal dimensions for each individual read-write head, one might choose to process each head slider individually. However, that approach is hardly feasible from a practical manufacturability standpoint because, for example, it results in a significantly more complex, inefficient, and costly head slider fabrication process.

Figure 2:
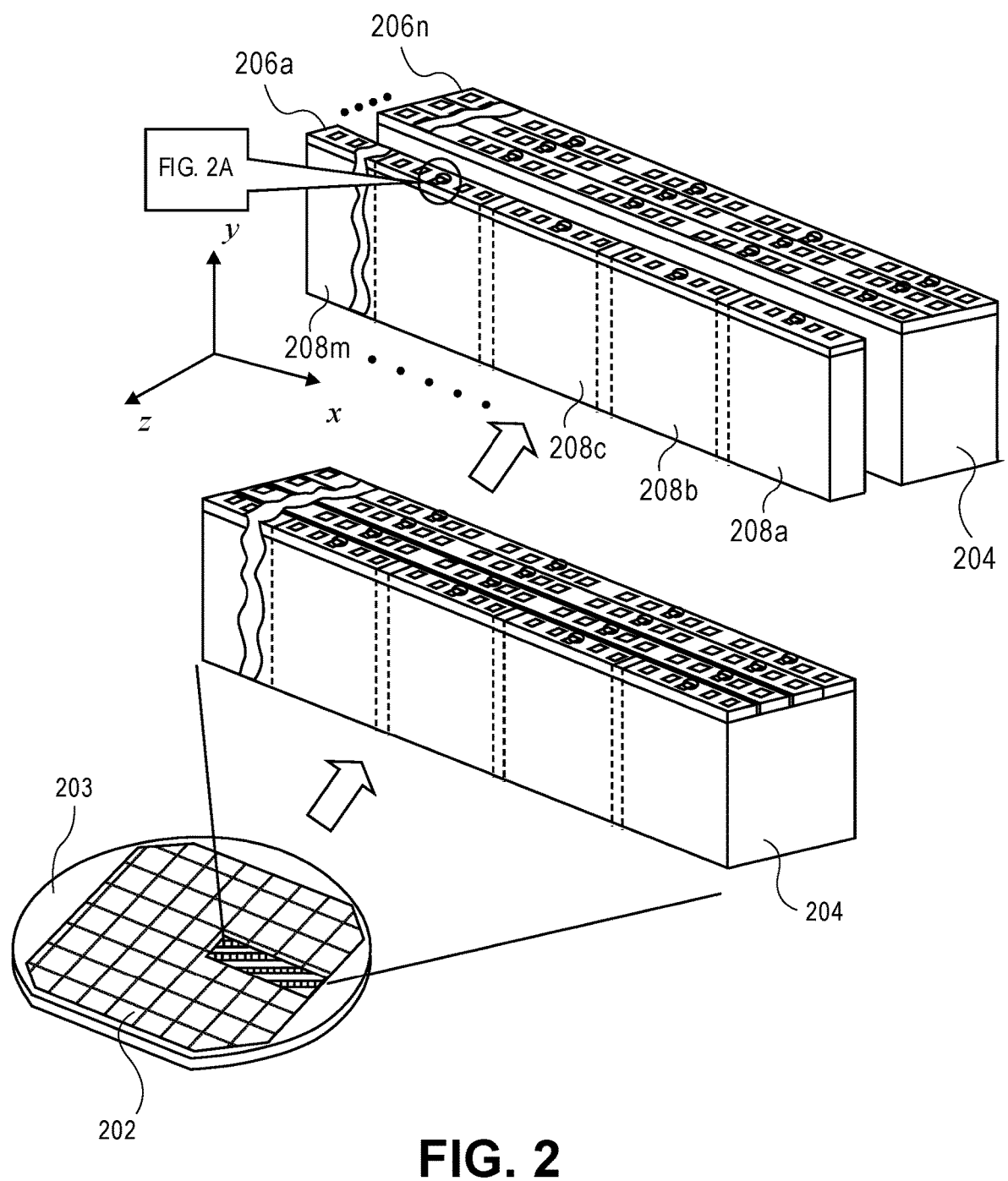
FIG. 2 is an exploded perspective view illustrating a wafer of head sliders in various stages of processing, according to an embodiment.
Figure 2A:
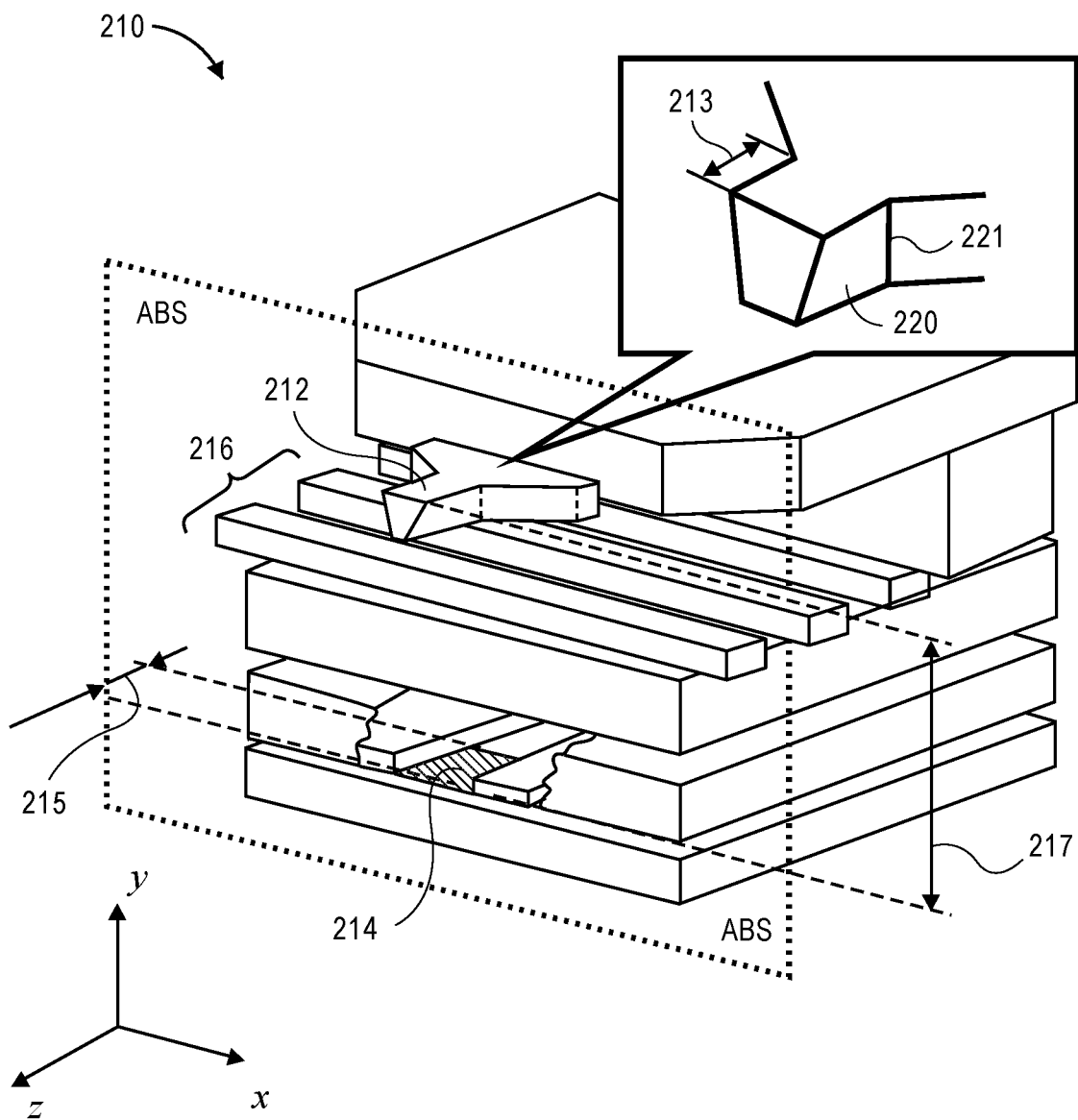
FIG. 2A is a perspective view illustrating a read-write transducer, according to an embodiment.

FIG. 2 is an exploded perspective view illustrating a wafer of head sliders in various stages of processing, and FIG. 2A is a perspective view illustrating a read-write transducer, both according to an embodiment. FIG. 2 depicts a wafer 202, comprising a matrix of unfinished head sliders having unfinished read-write transducers (see, e.g., FIG. 2A) deposited on a substrate 203, for which AlTiC is commonly used. The matrix of sliders is typically processed in batches, i.e., subsets of the wafer, historically referred to as "quads" and now at times referred to as "chunks" or "blocks". A block of unfinished head sliders, block 204, comprises multiple rows 206*a*-206*n* (or "row-bars") of unfinished head sliders, where n represents a number of row-bars per block 204 that may vary from implementation to implementation. Each row 206*a*-206*n* comprises multiple head sliders 208*a*-208*m*, where m represents a number of head sliders per row 206*a*-206*n* that may vary from implementation to implementation.

With reference to FIG. 2A, read-write transducer 210 comprises a writer element 212 (or simply "writer 212") and a corresponding coil 216. Write heads make use of the electricity flowing through a coil such as coil 216 to produce a magnetic field. Electrical pulses are sent to the write head, with different patterns of positive and negative currents, where the current in the coil of the write head induces a magnetic field across the gap between the head and the magnetic disk, which in turn magnetizes a small area on the recording medium. A writer such as writer 212 has a corresponding flare point 213, which is the distance between (a) the end of the main pole (i.e., the end of the pole tip 220) of the writer and (b) the point 221 at which the pole tip 220 flares down to its smallest cross-section. The flare point 213 is commonly considered a critical dimension associated with a magnetic writer such as writer 212.

Continuing with FIG. 2A, read-write transducer 210 further comprises a reader element 214 (or simply "reader 214") having a corresponding stripe height 215, which is also considered a critical dimension associated with a magnetic reader such as reader 214. The flare point 213 of the writer 212 and the stripe height 215 of the reader 214 are commonly controlled in fabrication by, but not limited to, a "rough lap" process referred to as wedge angle lapping ("WAL"), which is described in more detail herein (such as in reference to FIG. 3).

Read-write transducers such as transducer 210 are further associated with a reader-writer offset 217 (or "read-write offset", or "RWO"), which is the distance between a certain point or surface of the reader 214 and a certain point or surface of the writer 212, in what is depicted as the y-direction. The RWO 217 is designed into the read-write transducer 210. However, uncontrollable (and undesirable) offsets between the writer 212 and the reader 214 may occur during wafer 202 fabrication, which may cause a linear and/or angular offset that may vary along a row in what is depicted as the x-direction. Any such offset is largely due to the fact that the writer 212 and the reader 214 are deposited in different thin-film layers and, therefore, is due to manufacturing process limitations. For example, the writer 212 and the reader 214 may not always line up precisely relative to the air bearing surface and/or relative to each other because of the challenges associated with exposing different masks having different patterns at different deposition layers, in nanometer-scale manufacturing processes.

Consequently, the RWO fabricated at the wafer level may not be precisely the target RWO. Hence, the aforementioned WAL (or "RWO angle") process is typically employed to align a row-bar RWO more closely to the target RWO. However, the aforementioned rough lapping WAL process can typically only reach a level of correction around 5 nm, and is typically applied "per row-bar" rather than "per slider". Thus, a finer, more precise lapping procedure could be considered useful.

Head Slider Fabrication Processes-Generally

A typical head slider fabrication process flow may include the following: a wafer (e.g., wafer 202 of FIG. 2) fabrication process, which includes deposition of the reader and writer elements (e.g., reader 214 and writer 212 of FIG. 2A), followed by block (or "quad") slicing to remove a block (e.g., block 204 of FIG. 2) of unfinished sliders from the wafer. An outer row (e.g., row 206a of FIG. 2) of sliders (e.g., head sliders 208a-208m of FIG. 2) from the block may then be rough lapped (e.g., wedge angle lapped) in order to fabricate close to the desired reader and writer dimensions (e.g., flare point 213 and stripe height 215 of FIG. 2A), and then the outer rough-lapped row (e.g., row 206a) sliced from the block (e.g., block 204). From there, the row may be further lapped, such as "back-lapped" to form the flexure-side surface opposing the air bearing surface (ABS), and "fine-lapped" (or "final lapped") to further refine the ABS surface. This then may lead to overcoating, and rail etching, etc. of the ABS surface to form the final air bearing or flying surface, at which point each head slider (e.g., head sliders 208a-208m) may be diced or parted from the row to individuate each finished head slider, whereby it can then be coupled with a flexure, assembled into a head-gimbal assembly (HGA), and so on.

Wedge Angle Lapping

As discussed, the flare point 213 (FIG. 2A) of the writer 212 (FIG. 2A) and the stripe height 215 (FIG. 2A) of the reader 214 (FIG. 2A) are commonly controlled in fabrication by, but not limited to, a rough lapping process referred to as wedge angle lapping ("WAL"). With "passive WAL control", a row-bar is lapped to a predetermined wedge angle ("WA"), often based upon off-line electrical test measurements, whereby the WA is controlled by lapping to a physical target angle. Alternatively, with "active WAL control", the row-bar is served or controlled to a desired RWO, based on resistance-based feedback (e.g., from use of electronic lapping guides, or "ELGs", associated with the reader and/or writer elements). In both cases, an average or median WA is targeted for the entire row-bar, without individual control of the head sliders within the row-bar.

FIG. 3 is a diagram illustrating a wedge angle lapping (WAL) process, such as at a rough lap stage. The left-hand diagram of FIG. 3 depicts a head slider 302 before air bearing surface ("ABS") rough lapping. The reader 214 and corresponding desired stripe height 215 are depicted, the lapping of which as previously mentioned is typically controlled via a resistance-based feedback mechanism, and the writer 212 and corresponding resultant flare point 213 are also depicted. A dashed line illustrates the desired final ABS, which is achieved by lapping the ABS side of the head slider 302 at a wedge angle 303.

Thus, with reference to the right-hand side diagram of FIG. 3, ABS lapping may be performed on head slider 302 using a lapping fixture 304 and a lapping plate 306 (e.g., commonly diamond-encrusted and/or accompanied by a diamond slurry), depicted in simplified form. The fixture 304 is set such that the lapping plate 306 operates to lap the head slider 302 at a wedge angle 303 until target reader 214 and writer 212 dimensions are ultimately reached, thereby achieving read-write head having at least the desired stripe height 215 for this particular portion of the head slider fabrication process.

Wedge angle lapping is typically performed at a certain predetermined wedge angle on an entire row-bar of sliders, such as any of row 206a-206n (FIG. 2). Thus, each of the sliders 208a-208m (FIG. 2) within a given row is rough lapped at the same wedge angle, such as wedge angle 303 (FIG. 3). However, as previously mentioned, an undesirable offset(s) between the writer 212 (FIG. 2A) and the reader 214 (FIG. 2A) may occur during wafer 202 (FIG. 2) fabrication, which may cause a linear and/or angular offset in one or more directions. Furthermore, such an offset(s) corresponding to the writer 212 and the reader 214 may not be constant along the length (x-direction) of any given row (e.g., row 206a) of head sliders, nor across multiple rows (e.g., rows 206a-206n) from a block (e.g., block 204 of FIG. 2). Again, therein lies a reason that processing of head sliders individually, if practically feasible, may be considered desirable.

Figure 4:
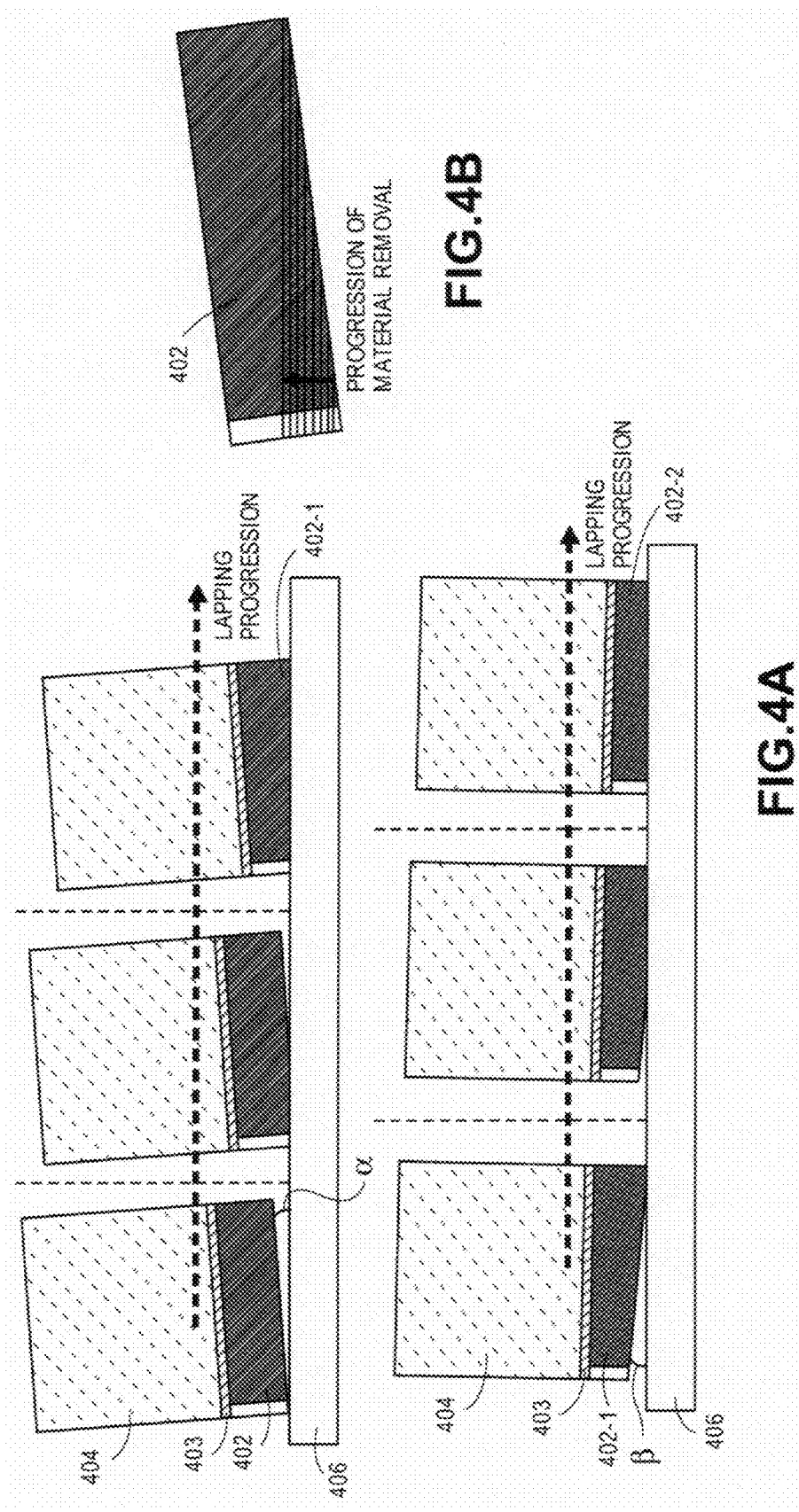
FIGS. 4A, 4B are diagrams illustrating a rigid bond WA lapping process.

FIGS. 4A, 4B are diagrams illustrating a rigid bond WA lapping process, which may be applicable to a scenario as depicted in FIG. 3. FIG. 4A depicts a series of "snapshots" (with each snapshot separated by a vertical dashed line) of a rough lap WAL process, in which an unfinished head slider 402 is temporarily bonded to a rigid tooling fixture 404 using a rigid adhesive bond 403. In the top portion of FIG. 4A, it is appreciated that the head slider 402 is progressively lapped at a first wedge angle α, using a lapping plate 406, thus fabricating a head slider 402-1 depicted as having a first quadrilateral polygon shape. Lapping at the wedge angle α may be with the purpose of achieving a particular target stripe height for the reader (such as stripe height 215 for reader 214 of FIG. 2A). With reference to FIG. 4B, it is appreciated that at the constant wedge angle α, the progression of head slider 402 material removal is uniform (i.e., at a constant angle) as lapping progresses through the WAL process to reach head slider 402-1.

In the bottom portion of FIGS. 4A, 4BA, it is appreciated that the head slider 402-1 is progressively lapped at a second wedge angle β, continuing to use the lapping plate 406, thus fabricating a head slider 402-2 depicted as having a second quadrilateral polygon shape. This lapping to the constant wedge angle β is similarly uniform as lapping progresses through the WAL process to reach head slider 402-2. It is noteworthy that, in current practice, adjustment of the wedge angle can typically only be made one or two times during the rough lap WAL process depicted in FIGS. 4A, 4B. Furthermore, use of constant wedge angles, even if adjusted once or twice, may produces a facet(s) in the head slider (best depicted in head slider 402-1). Still further, it is noteworthy that this rough lap WAL process is commonly employed by targeting a reader element stripe height (such as stripe height 215 for reader 214 of FIG. 3), and obtaining lapping feedback via a reader or writer ELG, while the writer element flare point (such as flare point 213 for writer 212 of FIG. 3) and the RWO 217 (FIG. 2) are relatively uncontrolled.

Lapping Tool for Within-Row Wedge Angle Lapping

Figure 5:
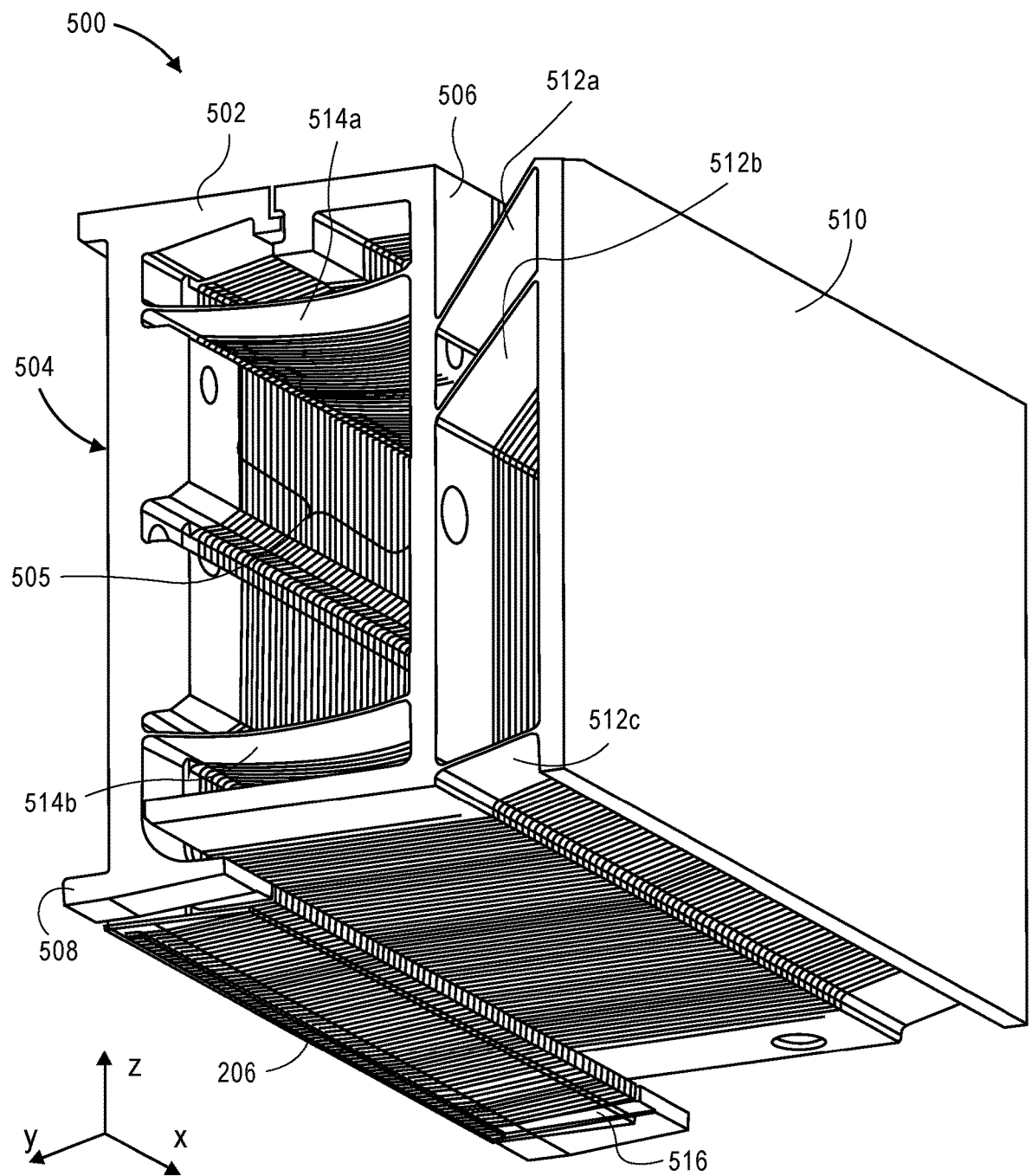
FIG. 5 is a bottom side perspective view illustrating a lapping tool, according to an embodiment.
Figure 6:
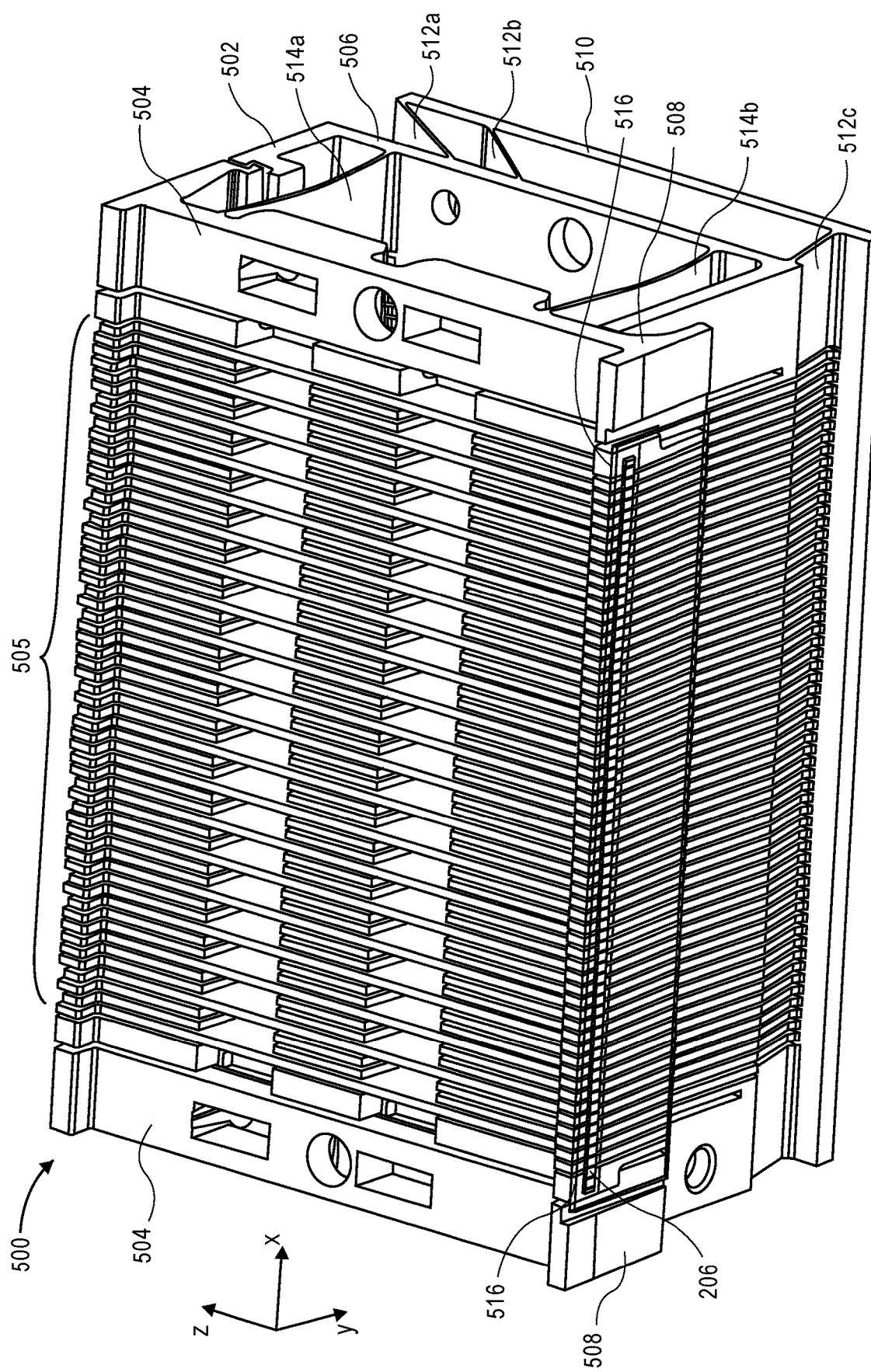
FIG. 6 is a bottom front perspective view illustrating the lapping tool of FIG. 5, according to an embodiment.

FIG. 5 is a bottom side perspective view illustrating a lapping tool, and FIG. 6 is a bottom front perspective view illustrating the lapping tool of FIG. 5, both according to embodiments. Lapping tool 500 comprises a box structure 502 that, according to an embodiment, is rotatable and/or flexible. The box structure 502 includes a front side 504 housing a plurality of force pins 505 that are generally translatable in a z-direction, and a back wall 506.

The lapping tool 500 further comprises a fixture 508 for holding a row-bar 206 of magnetic read-write head sliders, such that each of the plurality of force pins 505 is positioned to apply a force to a corresponding head slider of the row-bar 206. The lapping tool 500 further comprises a second back wall 510 a distance from the back wall 506 of the box structure 502, and at least two flexible wedge angle (WA) flexures 512a, 512b (three depicted, along with WA flexure 512c) interconnecting the back wall 506 of the box structure 502 and the second back wall 510. Notably, the WA flexures 512a, 512b, 512c "virtually" intersect at, and therefore define, an axis of rotation about an x-axis associated with the row-bar 206 (depicted and described in more detail in reference to FIGS. 7, 7A). Hence, in response to actuation, and based on the virtual intersection of the WA flexures 512a, 512b, 512c, each force pin 505 applies a torque to its corresponding head slider about the axis of rotation defined by the virtual intersection of the WA flexures 512a, 512b, 512c.

Based on the foregoing interacting structures of lapping tool 500, an independent and variable wedge angle (relative to the y-axis direction) can be set for each head slider (e.g., head slider 208a-208m of FIG. 2) of the row-bar 206, for lapping to a respective target wedge angle. In effect, the plurality of force pins 505, in response to actuation, collectively twists the row-bar 206 to concurrently set each head slider of the row-bar 206 for concurrent lapping to its respective target wedge angle.

According to an embodiment, the lapping tool 500 further comprises a compliant elastomer 516 between each force pin 505 and its corresponding head slider (e.g., head slider 208a-208m of FIG. 2) of the row-bar 206, to transfer a y-direction pressure gradient (e.g., pressure gradient 904a of FIG. 9A) corresponding to the torque from the force pin 505 to the corresponding head slider 208a-208m. As such, the material removal associated with each head slider 208a-208m due to lapping corresponds to the pressure gradient 904a applied to each respective head slider 208a-208m.

According to an embodiment, the material of elastomer 516 has a Shore A hardness in a range of 10-90 durometer, which is found suitable for its intended purpose. For example, use of a compliant elastomer 516 (rather than a rigid bond such as rigid adhesive bond 403 of FIG. 4A), for non-limiting examples, a silicon or polyurethane rubber (e.g., 0.05-1.5 mm thick, a range found suitable for its intended purpose), effectively eliminates the action of the head slider lifting off the lapping plate and associated faceting of the head slider which may occur with the rigid bond of FIG. 4A. Furthermore, the thicker the elastomer 516, the softer the cushion it provides between the force pins 505 and the head sliders 208a-208m (FIG. 2) and, therefore, finer control of the pressure gradient 904a across each head slider 208a-208m is achieved. That is, the response corresponding to actuation of the force pins 505 and their effect on the head sliders 208a-208m is effectively dampened. Likewise, the harder the elastomer 516, the more rapid the response corresponding to actuation of the force pins 505 and their effect on the head sliders 208a-208m (i.e., the response is less dampened and finer actuation control for more gradual change should be provided). Thus, the effective resolution of the pressure gradient 904a across each head slider can vary from implementation to implementation, based on the choice of material used for the compliant elastomer 516.

The lapping tool 500 further comprises at least two flexible stripe height (SH) flexures 514a, 514b interconnecting the front side 504 and the back wall 506 of the box structure 502. In view of the structural support provided by the SH flexures 514a, 514b to the overall box structure 502, each force pin 505 can apply a z-directional force to its corresponding head slider (e.g., head slider 208a-208m of FIG. 2) of the row-bar 206, for lapping to a respective reader target stripe height (such as stripe height 215 for reader 214 of FIG. 2A). Thus, based on the foregoing interacting structures of lapping tool 500, an independent reader target stripe height (relative to the z-axis) can be set for each head slider of the row-bar 206, for lapping to its respective target stripe height.

Lapping Tool Wedge Angle Flexures

Figure 7:
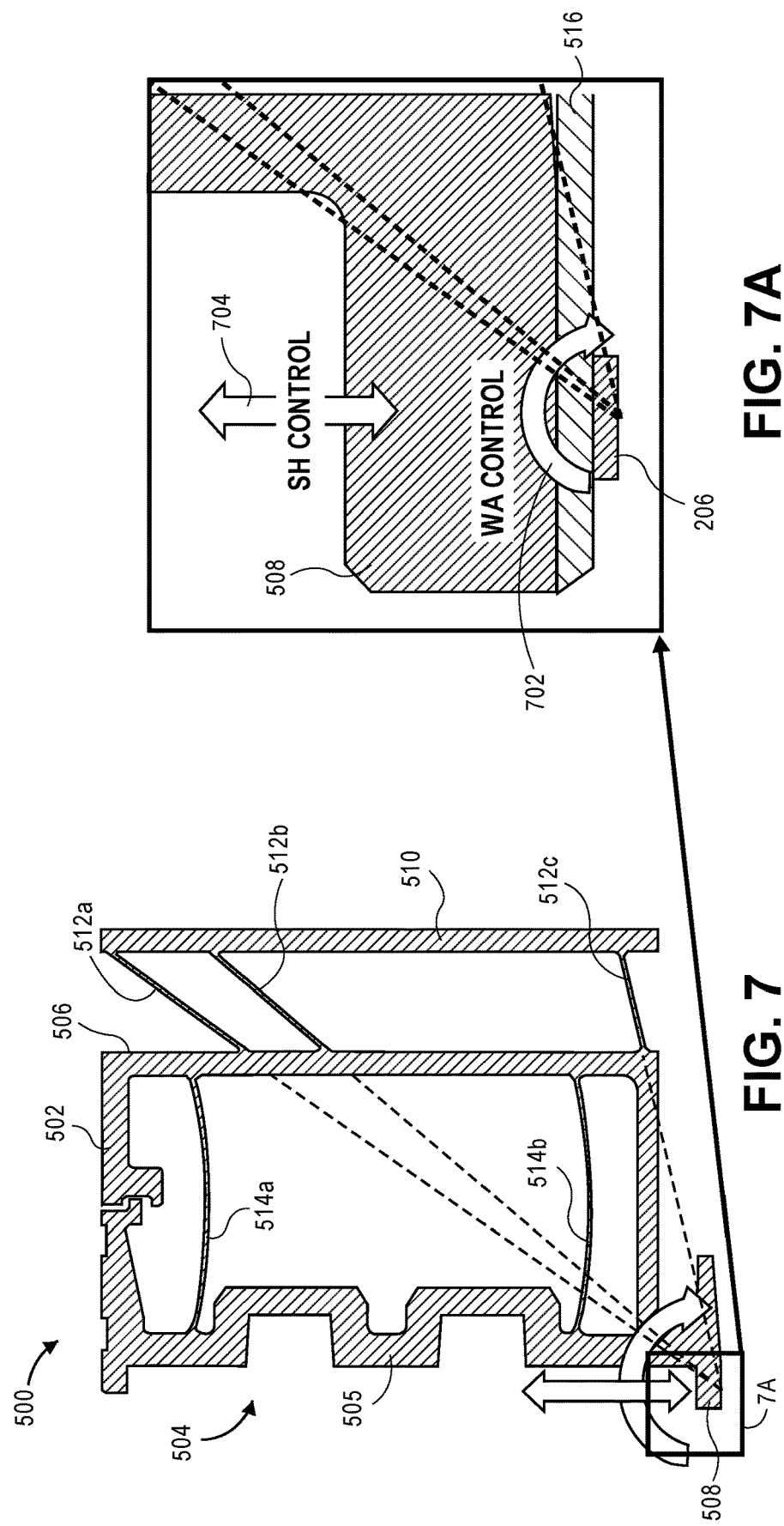
FIG. 7 is a cross-sectional side view illustrating the lapping tool of FIGS. 5-6, according to an embodiment.

FIG. 7 is a cross-sectional side view illustrating the lapping tool of FIGS. 5-6, and FIG. 7A is a cross-sectional side view illustrating a fixture of the lapping tool of FIG. 7, both according to embodiments. FIGS. 7 and 7A are referenced to describe in more detail the WA flexures 512a, 512b, 512c (FIGS. 5-6).

FIG. 7 illustrates the lapping tool 500 and constituent components, according to embodiments described in reference to FIGS. 5-6. FIGS. 7 and 7A further illustrate that the at least two wedge angle (WA) flexures 512a, 512b (and optional 512c), which interconnect the back wall 506 of the box structure 502 and the second back wall 510, are positioned and configured such that the WA flexures 512a, 512b (and 512c) "virtually" intersect at, and therefore define, an axis of rotation about an x-axis associated with the row-bar 206. Stated otherwise, the WA flexures 512a, 512b (and 512c) are positioned such that if they were to extend through and beyond the back wall 506 and the front side 504 of box structure 502, they would all intersect at a point that defines an axis of rotation (in the x-direction). It is this axis of rotation about which a torque is applied to a head slider (e.g., 208a-208m of FIG. 2) by way of actuating a corresponding force pin 505, and thus about which the box structure 502 effectively rotates. Recall that the torque, when transferred through the compliant elastomer 516, manifests as a pressure gradient 904a applied across the length (y-direction) of the corresponding head slider. Hence, it is this independently and variably applied pressure gradient 904a that provides the WA lapping control (depicted as block arrow 702) about the common axis of rotation for each respective head slider. Because the axis of rotation is, according to an embodiment, designed to be at or near the centroid of and at the lapping interface/bottom face of the row-bar 206, precise, independent and dynamically variable (i.e., by varying the actuation of force pins 505) wedge angle control is provided for each head slider constituent to row-bar 206.

Figure 8:
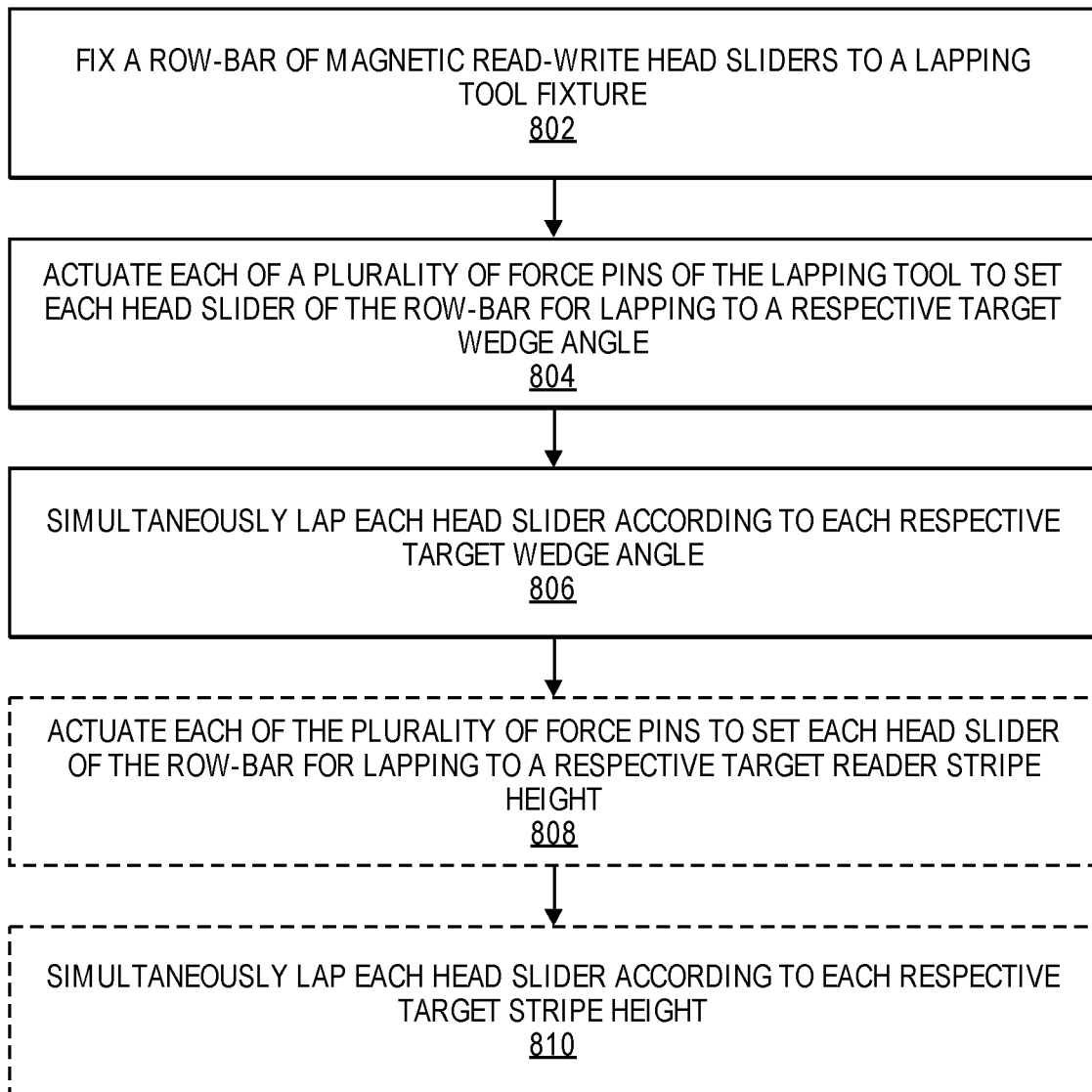
FIG. 8 is a flow diagram illustrating a method for lapping a row-bar of head sliders, according to an embodiment.

FIGS. 7 and 7A further illustrate a stripe height (SH) lapping control (depicted as block arrow 704), a use of which is described in reference to a method of lapping a row-bar in FIG. 8.

Method for Lapping a Row-Bar of Magnetic Read-Write Head Sliders

FIG. 8 is a flow diagram illustrating a method for lapping a row-bar of head sliders, according to an embodiment. The various embodiments described in reference to FIG. 8 may each be performed using the lapping tool 500 (FIGS. 5-7) described elsewhere herein. For context and as described, each row-bar has an x-axis along the direction of the row and a y-axis along the direction of a reader-writer offset associated with the head sliders in the row-bar, and each head slider comprises a reader element and a writer element.

At block 802, a row-bar of magnetic read-write head sliders is fixed to a lapping tool fixture. For example, row-bar 206 (FIGS. 5, 6, 7A) is affixed to fixture 508 (FIGS. 5-7A) of lapping tool 500 (FIGS. 5-7), such as via the elastomer 516 (FIGS. 5, 6, 7A). The tackiness of the elastomer 516 material has an effect on the capability of the elastomer 516 to hold the row-bar 206 in place on the fixture 508. Therefore, the tackiness of the elastomer 516 may vary from implementation to implementation.

At block 804, each of a plurality of force pins of the lapping tool is actuated to set each head slider of the row-bar for lapping to a respective target wedge angle. For example, each force pin 505 is actuated (for non-limiting examples, pneumatically, hydraulically, mechanically, electrically, and the like) to set each head slider 208a-208m (FIG. 2) of the row-bar 206 to a respective target wedge angle 303 (FIG. 3), which is an angle relative to a y-plane along the y-axis. The manner in which each respective target wedge angle is set is consistent with as described herein in reference to FIGS. 5-7A.

Thus, at block 806, each head slider is simultaneously lapped according to each respective corresponding target wedge angle. For example, each head slider 208a-208m of the row-bar 206 is lapped according to each corresponding target wedge angle 303. Recall from FIG. 3 that lapping may be performed on a head slider or a row-bar of head sliders using a lapping fixture 304 and a lapping plate 306, which is commonly diamond-encrusted and/or accompanied by a diamond slurry.

FIGS. 9A, 9B are diagrams illustrating a "soft" bond WA lapping process, according to an embodiment. Reference is further made to FIGS. 4A, 4B for a comparison of the soft bond WA lapping process of FIGS. 9A, 9B with the rigid bond WA lapping process of FIGS. 4A, 4B. FIG. 9A depicts a series of "snapshots" (with each snapshot separated by a vertical dashed line) of a "fine lap" (or "final lap") WAL process, in which an unfinished head slider 902 is temporarily bonded to a rigid tooling fixture 508 by way of a compliant elastomer 516. At the first snapshot, it is appreciated that a proper pressure gradient 904a for application to the head slider 902 to at least begin to achieve the target wedge angle is determined. For slider 902, a corresponding force pin 505 (FIGS. 5-6) is actuated to apply a torque to the lapping tool fixture 508 and through the elastomer 516 to the head slider 902 to generate the desired pressure gradient 904a across the length of the head slider 902. Note that the diagram of FIG. 9A is simplified in that the elastomer 516 appears with sharp lines at its interface with the head slider 902, e.g., as if a portion of elastomer 516 is cut away. However, appreciate that the elastomer 516 will compress (rather than cut out) in response to the torque, whereby the torque will cause greater compression within the elastomer 516 relative to the distance away from the axis of rotation (or center of torque) in the direction of the torque. Likewise, the torque will cause lesser compression within the elastomer 516 relative to the distance away from the axis of rotation (or center of torque) in the direction opposing the direction of the torque. Hence, pressure gradient 904a is depicted as smaller to larger in the direction from the left to the right. Consequently, with progressively larger point pressures applied to the head slider 902 across its length (due to the pressure gradient 904a), and in view of the head slider interfacing with a rigid lapping plate 406, more material is removed from the slider according to the pressure gradient 904a (i.e., from the left to the right).

With reference to FIG. 9B, it is appreciated that with application of pressure gradient 904a to the head slider 902, the progression of head slider 902 material removal is not at a constant angle as lapping progresses through the WAL process. Because there is some pressure across the entire length of the slider, albeit varying pressure according to the pressure gradient 904a, the progression of material removal is different from that with a rigid bond and constant lapping angle, as depicted in FIG. 4B. With application of the pressure gradient 904a, the lapping angle changes as material is progressively removed from the face of head slider 902, as depicted in FIG. 9B.

At the second (middle) snapshot, it is depicted that a slightly different pressure gradient 904b is applied to the head slider 902 to continue to achieve the target wedge angle, such as by way of a servo control change as the target wedge angle is approached. Hence, a lapping system and method as described herein provides for dynamically changing the wedge angle, per head slider, with a controlled feedback system (e.g., an ELG feedback system). The wedge angle may be dynamically changed by changing the force pin 505 actuation profile during the lapping process, whereby the lapping system is dynamically served to achieve a desired result. It is noteworthy that the use of progressively changing wedge angles due to the application of a pressure gradient using an elastomer, rather than the use of a constant rigid wedge angle, is much less likely to produce a facet(s) in the head slider.

Returning to the flow diagram of FIG. 8, at optional block 808, each of the plurality of force pins is actuated to set each head slider of the row-bar for lapping to a respective reader target stripe height. For example, each force pin 505 is servo or discretely actuated (for non-limiting examples, pneumatically, hydraulically, mechanically, electrically, and the like) to set each head slider 208a-208m (FIG. 2) of the row-bar 206 to a respective reader target stripe height 215 (FIGS. 2A, 3).

Continuing, at optional block 810, each head slider is simultaneously lapped according to each respective corresponding target stripe height. For example, each head slider 208a-208m of the row-bar 206 is lapped according to each corresponding reader 214 target stripe height 215 (which may be based on a reader ELG and/or writer ELG stripe height). Returning to FIG. 9A, at the third snapshot it is depicted that the torque and resultant pressure gradient(s) 904a (and 904b) across the head slider is discontinued (e.g., the target wedge angle has been reached), and a relatively (or "substantially") constant pressure 904c across the length of head slider 902 is now applied, to now lap to the target reader 214 stripe height 215.

Thus, according to an embodiment and as described elsewhere herein, in contrast with the rigid bond (rough) lapping process depicted in FIGS. 4A, 4B, this soft (fine) lap WAL process first laps to a target wedge angle and then laps to a target reader or writer stripe height, thereby providing multiple degrees of control, including control of the RWO (such as RWO 217 of FIG. 2). Compensating the process to first lap toward the target stripe height and then lap to the target wedge angle is also contemplated and within the scope of embodiments described herein.

Figure 10A:
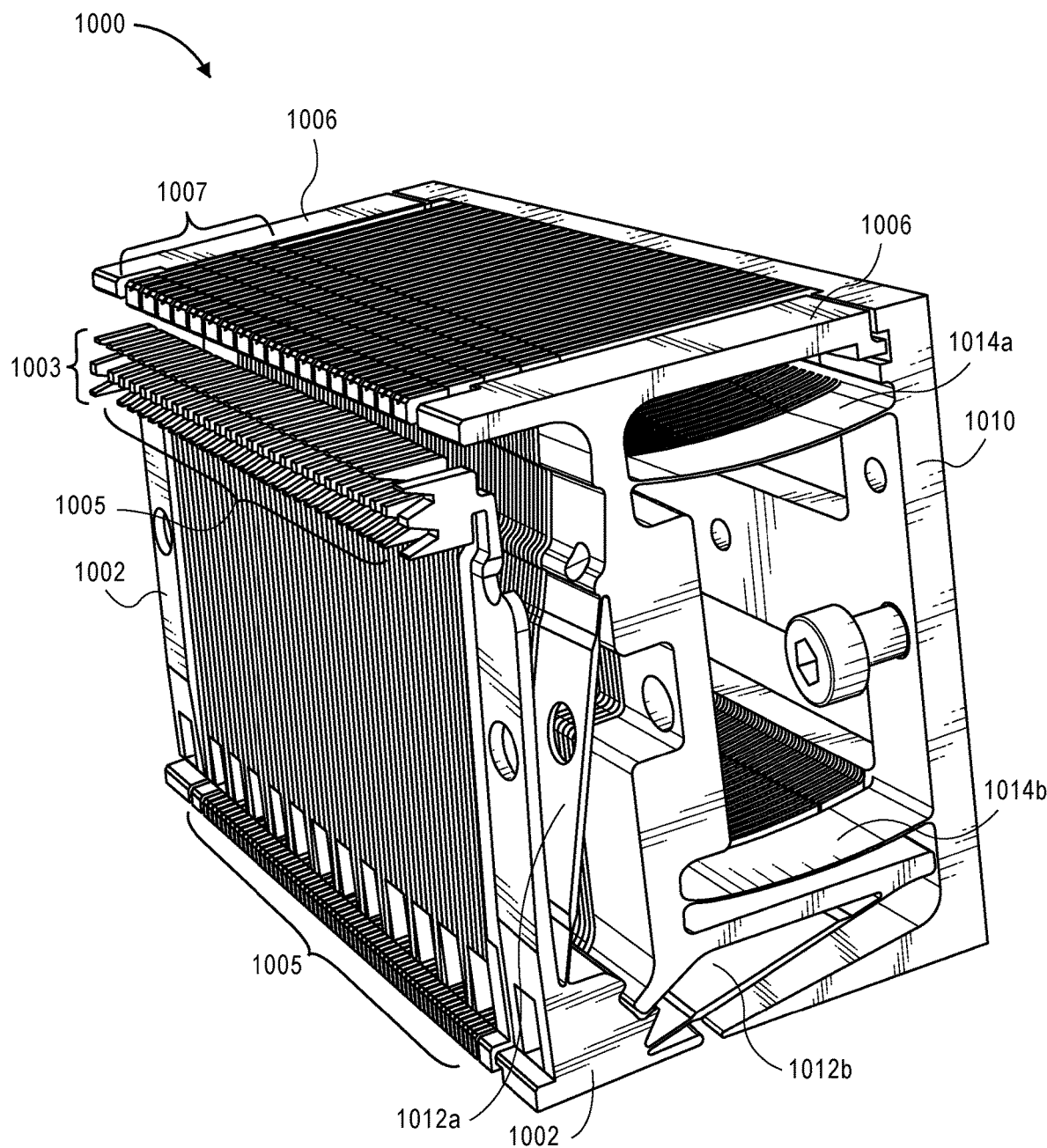
FIG. 10A is a front side perspective view illustrating a lapping mount tool, according to an embodiment.
Figure 10B:
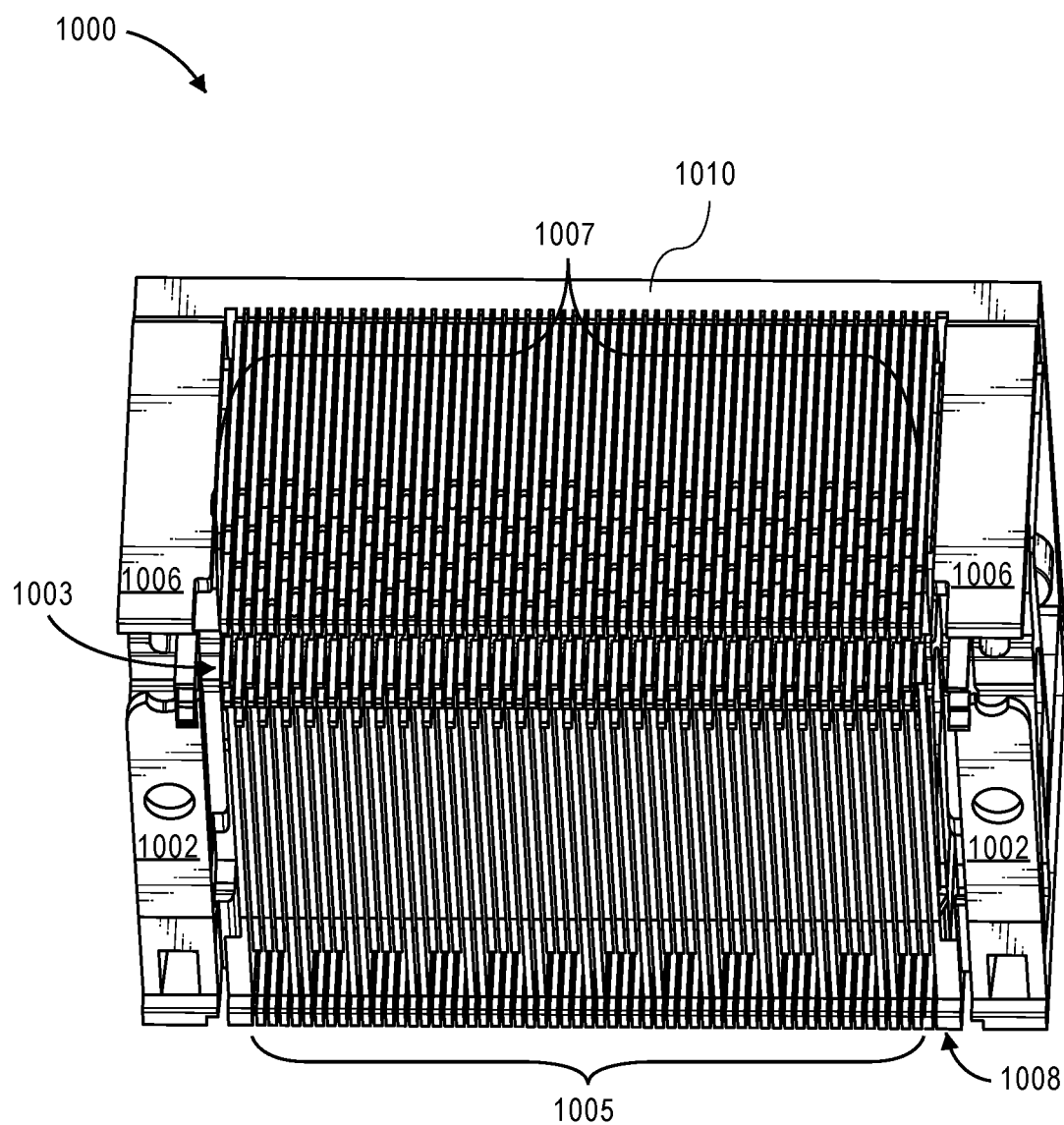
FIG. 10B is a front top perspective view illustrating the lapping mount tool of FIG. 10A, according to an embodiment.
Figure 10C:
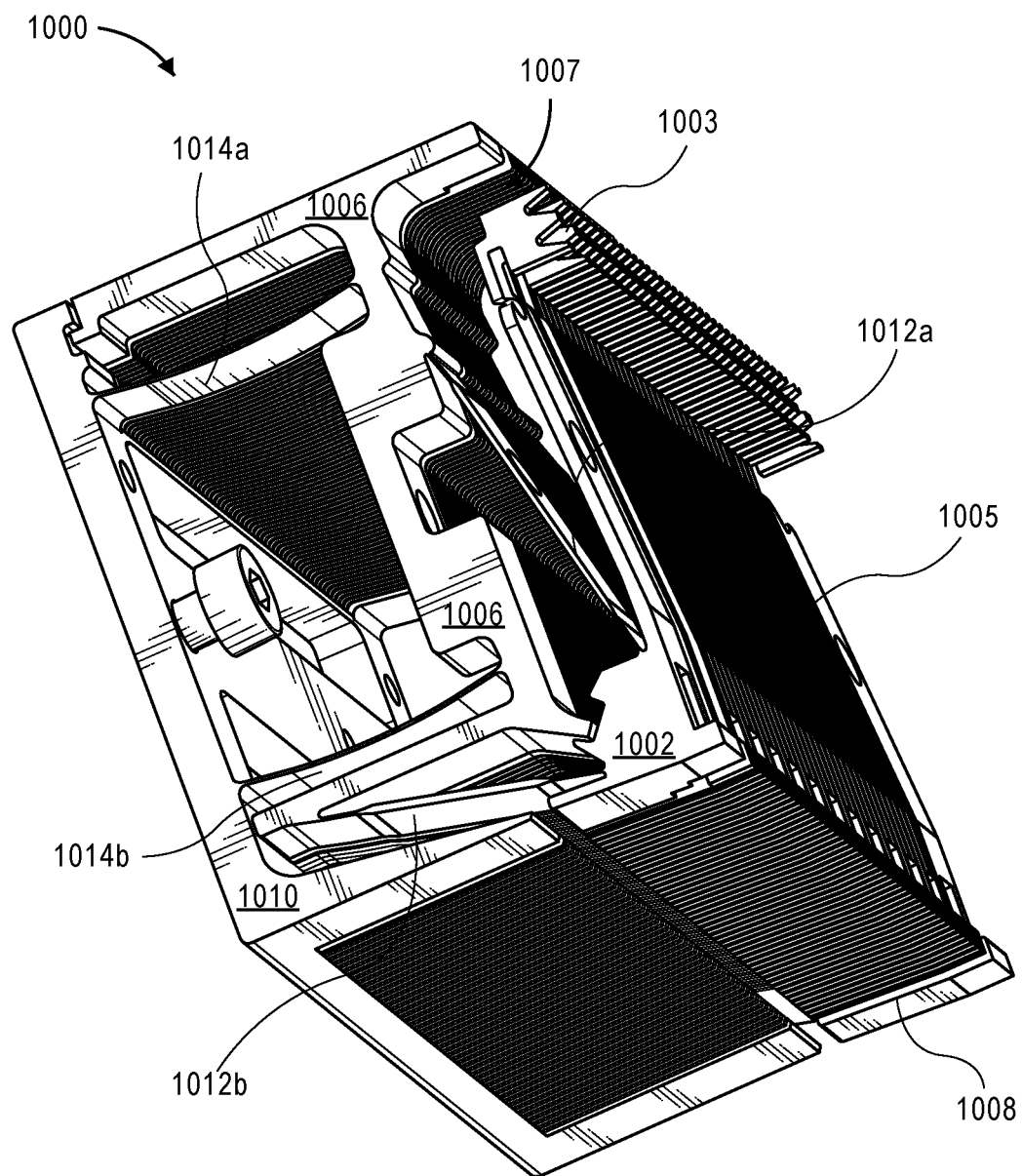
FIG. 10C is a bottom side perspective view illustrating the lapping mount tool of FIG. 10A, according to an embodiment.

Lapping Mount Tool for Within-Row Stripe Height/Flare Point and Wedge Angle Lapping FIG. 10A is a front side perspective view illustrating a lapping mount tool, FIG. 10B is a front top perspective view illustrating the lapping tool of FIG. 10A, and FIG. 10C is a bottom side perspective view illustrating the lapping tool of FIG. 10A, all according to an embodiment. Unless otherwise noted, many of the functional and operational concepts described in the context of lapping tool 500 are equally applicable to the lapping mount tool 1000 of FIGS. 10A-10C.

Lapping mount tool 1000 comprises a first structural member 1002 that, according to an embodiment, is rotatable and/or flexible. The first structural member 1002 houses a plurality of angular actuation pins 1005, each of which comprises a V-shaped notch ("V-notch"), or fork 1003 (for a non-limiting example, a two-tine fork), at the top at least in part for actuation purposes. Note that the first and last "pin" structures of the first structural member 1002 are structurally different from and depicted as wider than the inner angular actuation pins 1005, and mainly serve to protect the inner more fragile angular actuation pins 1005, according to an embodiment. However, the lapping mount tool 1000 would still be operable for its intended purpose if the first and last "pins" of the first structural member 1002 were to be left out of the tool, as they are not intended to interact with a corresponding head slider as are the bulk of the angular actuation pins 1005. According to an embodiment and as depicted, adjacent forks 1003 (e.g., a comb of forks) may be alternatingly staggered in the z-direction, which facilitates engagement between the actuation mechanisms and the corresponding forks 1003 in such a space-limited environment. However, the group of forks 1003 may be configured in line rather than staggered as depicted, according to an embodiment. The first structural member 1002 comprises a fixture 1008 for holding a row-bar of magnetic read-write head sliders (e.g., row 206a-206n of FIG. 2; generally, "row-bar 206"), such that each of the plurality of angular actuation pins 1005 is positioned to apply an angular lapping force to a corresponding head slider of the row-bar 206 in response to actuation (e.g., "second actuation").

The lapping tool 1000 further comprises a second structural member 1006 displaced from and coupled with the first structural member 1002 via, or by way of, a first flexible wedge angle (WA) flexure 1012a ("first flexure") and a second flexible wedge angle (WA) flexure 1012b ("second flexure"). The second structural member 1006 houses a plurality of stripe height (SH) actuation pins 1007, each positioned to apply a lapping force to a corresponding head slider of the row-bar 206. Similarly to the outer "pin" structures of the first structural member 1002, the first and last "pin" structures of the second structural member 1006 are structurally different from and depicted as wider than the inner SH actuation pins 1007, and mainly serve to protect the inner more fragile SH actuation pins 1007, according to an embodiment. However, the lapping mount tool 1000 would still be operable for its intended purpose if the first and last "pin" structures of the second structural member 1006 were to be left out of the tool, as they are not intended to interact with a corresponding head slider as are the bulk of the SH actuation pins 1007. According to an embodiment, each SH actuation pin 1007, in response to actuation (e.g., "first actuation"), applies a substantially z-direction force (see, e.g., linear lapping force 1105 of FIG. 11) to the corresponding head slider, thereby lapping to a respective target stripe height. According to embodiments, each SH actuation pin 1007 may be actuated to lap to a respective target stripe height for a reader element of the read-write head or to a respective target stripe height (also, "flare point 213" of FIG. 2A) for a writer element of the read-write head.

The lapping tool 1000 further comprises a third structural member 1010 coupled with the second structural member 1006 via, or by way of, a third flexible flexure 1014a ("third flexure") and a fourth flexible flexure 1014b ("fourth flexure").

Figure 11:
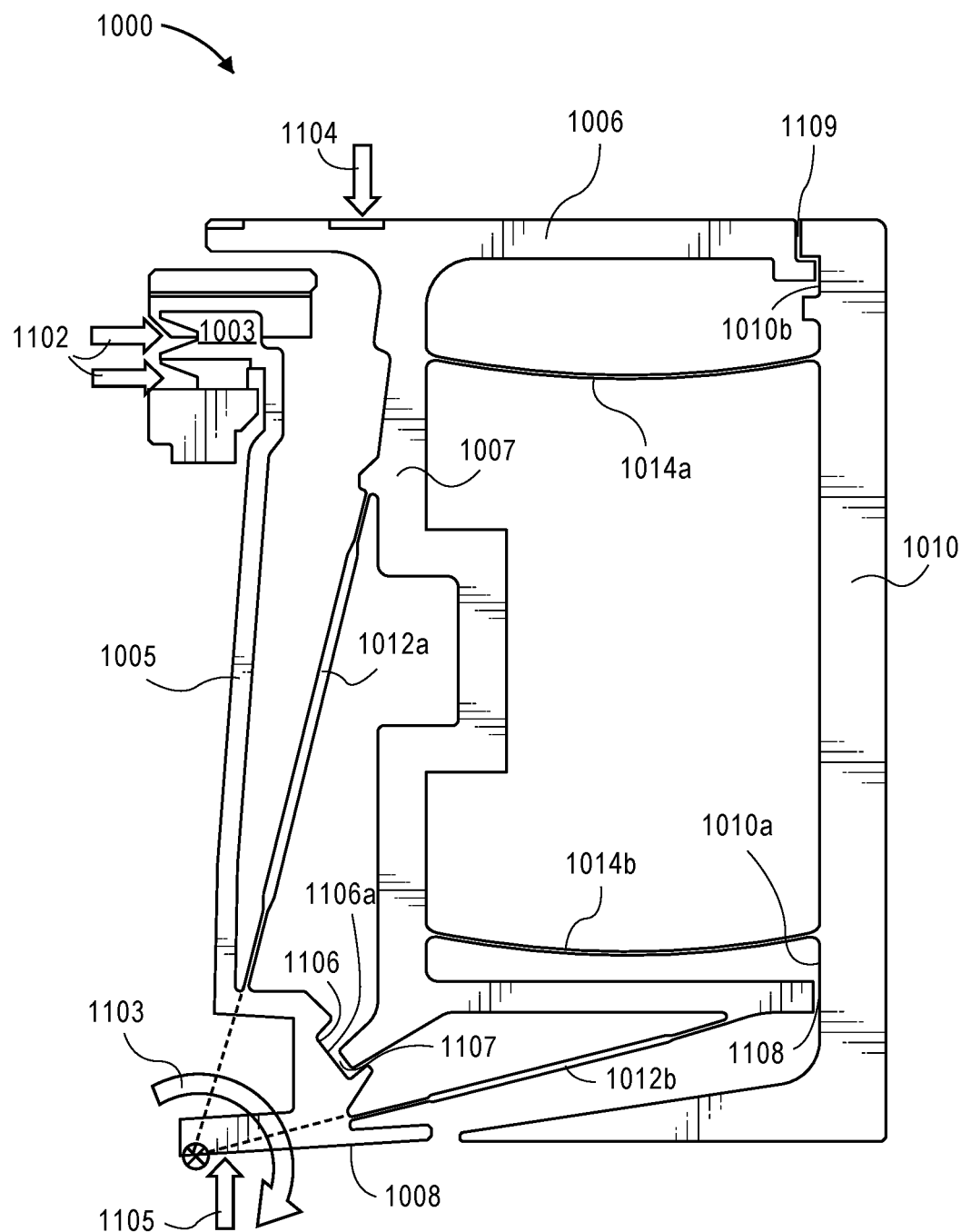
FIG. 11 is a cross-sectional side view illustrating the lapping mount tool of FIGS. 10A-10C, according to an embodiment.

Notably, the first and second flexures 1012a, 1012b "virtually" intersect at, and therefore define, an axis of rotation about an x-axis associated with the row-bar 206 (depicted and described in more detail in reference to FIG. 11). Hence, in response to actuation (e.g., "second actuation"), and based on the virtual intersection of the first and second flexures 1012a, 1012b, each angular actuation pin 1005 applies an angular lapping force (e.g., a torque) to its corresponding head slider about the axis of rotation defined by the virtual intersection of the first and second flexures 1012a, 1012b.

Based on the foregoing interacting structures of lapping mount tool 1000, an independent and variable stripe height (in the z-axis direction) can be set for each read-write head of the row-bar 206, for lapping to a respective reader or writer target stripe height (at times referred to as the "flare point" for the writer element) by way of actuating the stripe height actuation pins 1007. Likewise, an independent and variable wedge angle (relative to the y-axis direction) can be set for each head slider (e.g., head slider 208a-208m of FIG. 2) of the row-bar 206, for lapping to a respective target wedge angle by way of actuating the angular actuation pins 1005 and according to the effect of the virtual intersection of the first and second flexures 1012a, 1012b. In effect, the plurality of angular actuation pins 1005, in response to actuation, collectively twists the row-bar 206 to concurrently set each head slider of the row-bar 206 for concurrent lapping to its respective target wedge angle.

According to an embodiment, the lapping tool 1000 may further comprise a compliant elastomer (such as elastomer 516 of FIG. 5) adhered to the fixture 1008 of the first structural member 1002 and to the row-bar 206, to transfer a y-direction pressure gradient (e.g., pressure gradient 904a of FIG. 9A) corresponding to the angular lapping force from each angular actuation pin 1005 to the corresponding head slider 208a-208m. As such, the material removal associated with each head slider 208a-208m due to lapping corresponds to the pressure gradient 904a applied to each respective head slider 208a-208m.

Regarding the compliant elastomer 516, which is employed to attach/adhere the row-bar 206 to angular actuation pins 1005 of the lapping mount tool 1000, the angular change from neighbor angular actuation pins 1005 may induce separation of the elastomer 516 from the angular actuation pins 1005, which may in turn induce separation of the row-bar 206 from the elastomer 516 during lapping. According to an embodiment, the elastomer 516 has a first level of surface roughness on the side facing the fixture 1008 and a second level of surface roughness for the opposing side facing the row-bar 206, where the second level of surface roughness is higher than the first level surface roughness. Hence, the effective adhesion forces are less for the higher surface roughness (i.e., by reducing the effective contact area) on the row-bar 206 side, thereby providing for a more stable row-bar 206 removal process (e.g., fewer row-bars are likely to break upon removal from the elastomer 516 after lapping). In contrast, the opposing fixture 1008 side of the elastomer 516 is made with a relatively smooth level of surface roughness, which maximizes the effective contact area to the mount tool pins 1005, 1007 to achieve relatively high levels of adhesion.

Lapping Mount Tool Wedge Angle Flexures

FIG. 11 is a cross-sectional side view illustrating the lapping tool of FIGS. 10A-10C, according to an embodiment. FIG. 11 (with reference also to FIG. 7A for similar functionality) are referenced to describe in more detail the operation of the first and second flexures 1012a, 1012b.

FIG. 11 illustrates a cross sectional side view of the lapping tool 1000 and constituent components, according to embodiments described in reference to FIGS. 10A-10C. FIG. 11 illustrates that the first and second flexures 1012a, 1012b, which interconnect the rotatable first structural member 1002 and the second structural member 1006, are positioned and configured such that the first and second flexures 1012a, 1012b "virtually" intersect at, and therefore define, an axis of rotation about an x-axis associated with the row-bar 206. It is this axis of rotation about which an angular lapping force 1103 is applied to a head slider (e.g., 208a-208m of FIG. 2) by way of actuating 1102 a corresponding angular actuation pin 1005, and thus about which the first structural member 1102 (e.g., acting as a lever) and associated fixture 1008 effectively rotate. Recall that the angular lapping force 1103 (or torque), when transferred through the compliant elastomer 516, manifests as a pressure gradient 904a (FIG. 9) applied across the length (y-direction) of the corresponding head slider. Hence, it is this independently and variably applied pressure gradient 904a that provides the WA lapping control (e.g., depicted as block arrow for lapping force 1103) about the common axis of rotation for each respective head slider. Because the axis of rotation is, according to an embodiment, designed to be at or near the centroid of and at the lapping interface/bottom face of the row-bar 206, precise, independent and dynamically variable (i.e., by varying the actuation 1102 of angular actuation pins 1005) wedge angle control is provided for each head slider constituent to row-bar 206.

FIG. 11 further illustrates that the stripe height actuation pins 1007 are positioned and configured such that a linear lapping force 1105 (e.g., depicted as block arrow for linear force 1105) is applied to a head slider (e.g., 208a-208m of FIG. 2) by way of actuating 1104 a corresponding stripe height actuation pin 1007. Hence, precise, independent and dynamically variable (i.e., by varying the actuation 1104 of angular actuation pins 1007) stripe height/flare point control is provided for each head slider constituent to row-bar 206.

Drop-Shock Proof Features

As lapping mount tool 1000 may be implemented for uses/operations in which the lapping mount tool 1000 is handled, such as moved around a manufacturing site and possibly among different tools (e.g., by an operator or robotic machine), the effect of drop-shocks/impacts upon the lapping mount tool 1000 is a consideration, keeping in mind that the various actuation pins 1005, 1007 may be relatively thin and fragile components. Thus, with reference back to FIG. 11 and according to an embodiment, one or more gap control measures, which function to limit displacement, may be incorporated into the configuration of lapping mount tool 1000, for providing some structural spatial tolerance between components of the lapping mount tool 1000. According to an embodiment, a gap 1107 is provided between a terminal portion of the stripe height actuation pins 1007 of the second structural member 1006 and the surface 1106a of a notch 1106 located toward a distal side of the first structural member 1002. According to an embodiment, a gap 1108 is provided between a distal terminal portion of the second structural member 1006, to which the second flexure 1112b is attached, and an opposing proximal surface 1010a of the third structural member 1010, and/or a gap 1109 is provided between a distal terminal portion of the second structural member 1006 and an opposing proximal surface 1010b of the third structural member 1010. The number of drop-shock gaps implemented may vary from implementation to implementation, as any one or more of the gaps 1107, 1108, 1109 may be implemented to provide drop-shock protection to the lapping mount tool 1000. In particular, the foregoing multi-direction gap measures are capable of reducing the effect of a shock/impact event upon the lapping mount tool 1000 primarily in the y-direction (e.g., gaps 1108, 1109) but also in the z-direction (e.g., gap 1107).

Furthermore, at least in part due to the combined mass of the first structural member 1002 (including the angular actuation pins 1005), the stripe height actuation pins 1007, and the primary supporting structure of the second structural member 1006 for the stripe height actuation pins 1007, drop testing in the y-direction has shown a tendency to induce buckling in the third and fourth flexures 1014a, 1014b interconnecting the second structural member 1006 and the third structural member 1010. Hence, according to an embodiment, the third and fourth flexures 1014a, 1014b may be implemented as curved flexure beams (curved along the y-direction, such as depicted in FIG. 11) to inhibit or prevent the buckling mode of these flexures by effectively reducing or relaxing the maximum stress imparted to the third and fourth flexures 1014a, 1014b upon a shock/impact event. Utilization of such curved flexure beams may be implemented with and may function further in conjunction with the foregoing gap measures.

As discussed, the lapping mount tool 1000 may be implemented for uses/operations in which the lapping mount tool 1000 is handled, such as transported around a manufacturing site and possibly among different tools, so the effect of drop-shocks/impacts upon the lapping mount tool 1000 is a consideration. More particularly, according to an embodiment, the lapping mount tool 1000 is conjoined with one or more structural housing interconnects to house the lapping mount tool 1000 as well as to interconnect the mount tool 1000 to other components, higher-level lapping tools and/or fixtures, thus providing a lapping tool assembly, which may be handled and transported around a manufacturing site and possibly among different tools.

Figure 12A:
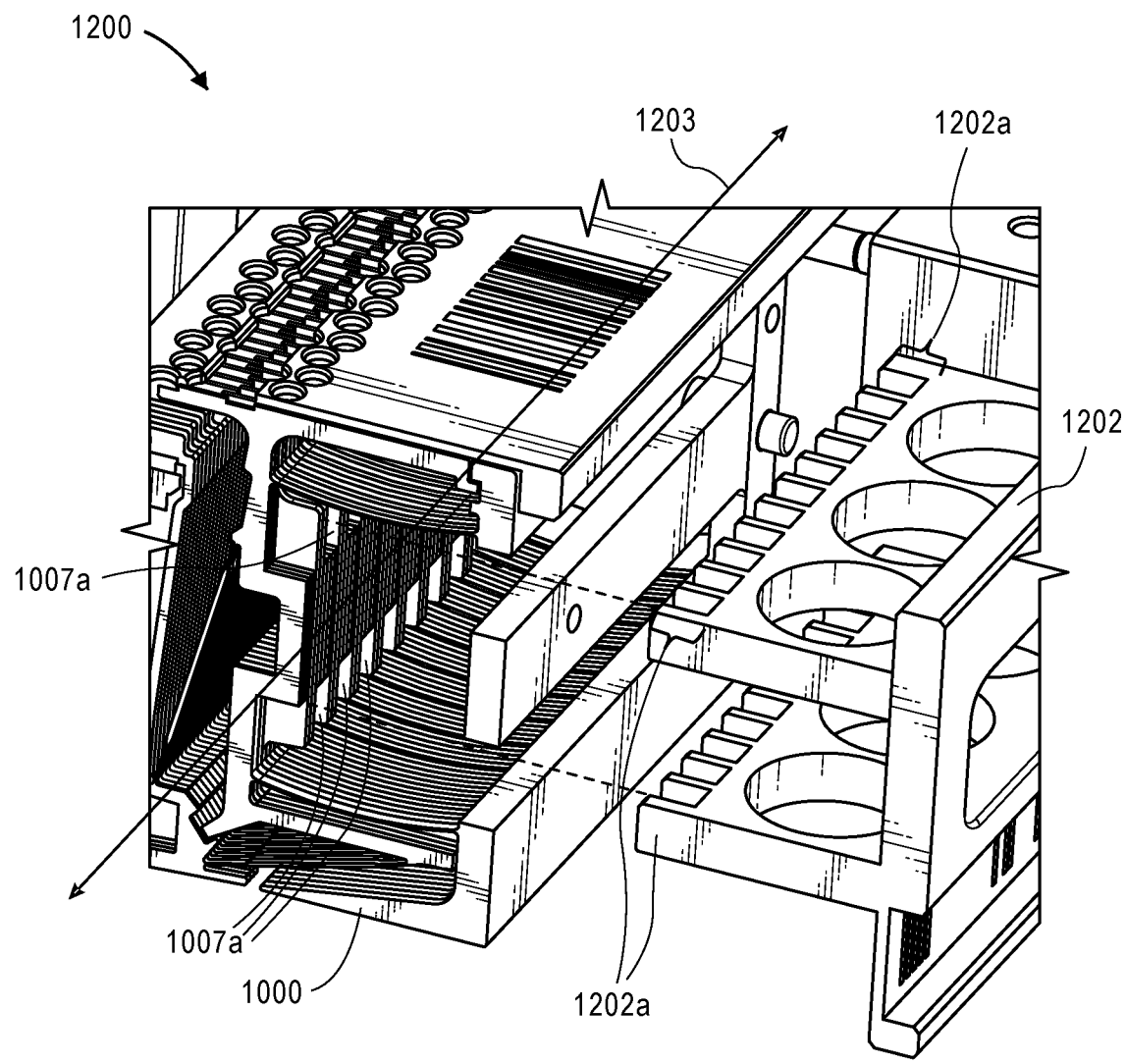
FIG. 12A is an exploded top side perspective view illustrating a portion of a lapping tool assembly, according to an embodiment.
Figure 12B:
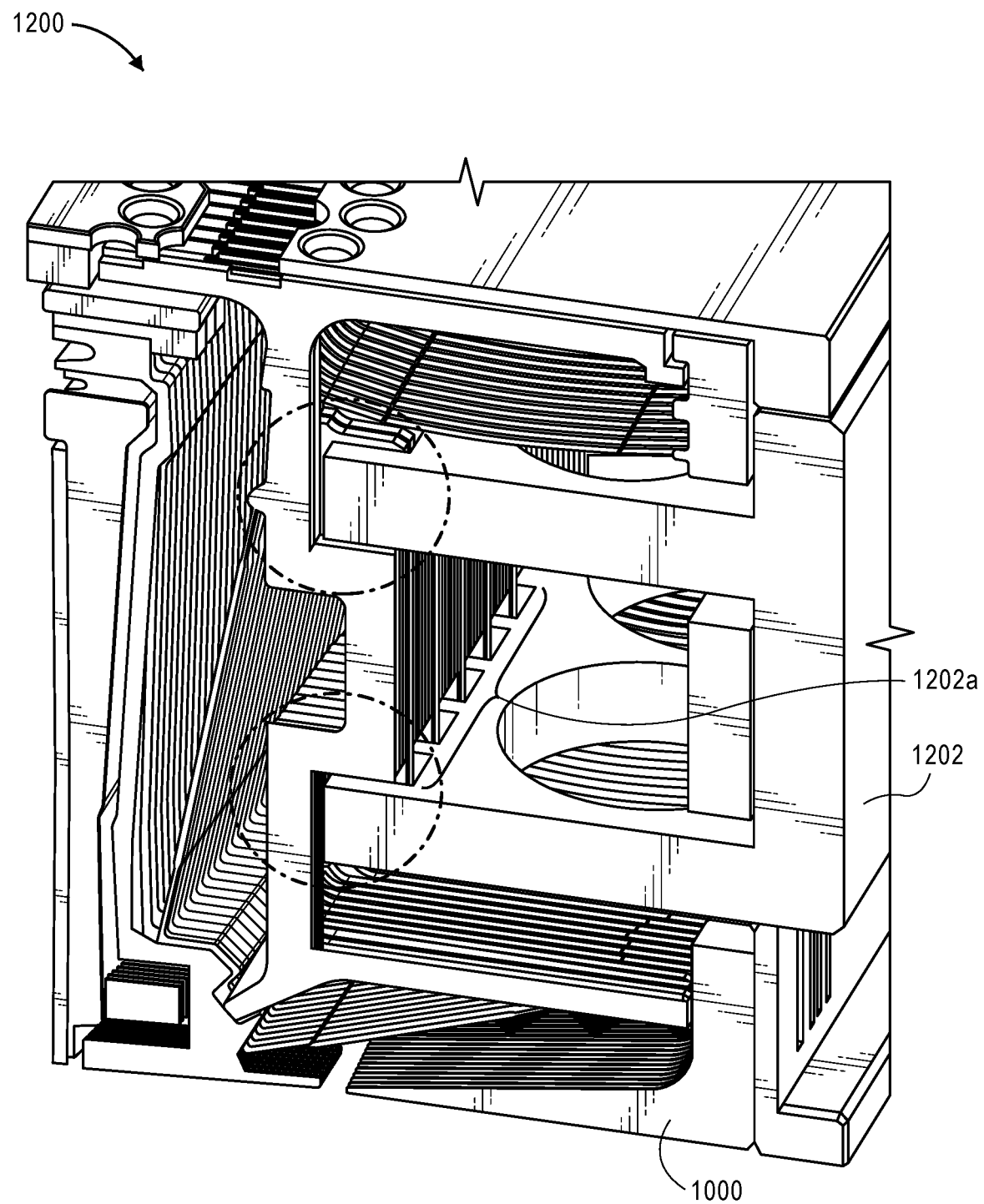
FIG. 12B is a top side perspective view illustrating a portion of the lapping tool assembly of FIG. 12A, according to an embodiment.

FIG. 12A is an exploded top side perspective view illustrating a portion of a lapping tool assembly, and FIG. 12B is a top side perspective view illustrating a portion of the lapping tool assembly of FIG. 12A, according to an embodiment. Lapping tool assembly 1200 comprises the lapping mount tool 1000 conjoined with or coupled to an assembly base part 1202 ("assembly base 1202"). Assembly base 1202 comprises a plurality of interlocking pins 1202*a* (e.g., a "comb"). Each adjacent interlocking pin 1202*a*, when engaged with the lapping mount tool 1000, is positioned within a corresponding pocket 1007*a* associated with a group of adjacent stripe height actuation pins 1007 (see, e.g., dashed circles of FIG. 12B). Hence, engagement of the pins 1202*a* of the assembly base 1202 with the lapping mount tool 1000 thereby functions to limit displacement and material stress of the stripe height actuation pins 1007, primarily in the x-direction (as depicted by arrow 1203 of FIG. 12A), but also in the z-direction resulting from the structural configuration and shape of the pockets 1007*a*. Thus, the stripe height actuation pins 1007 may be protected from damage (which may affect mount tool accuracy and performance) upon the lapping tool assembly 1200 being dropped in the direction of arrow 1203, generally, and/or experiencing a drop-shock/impact having a force component in the direction of arrow 1203.

Figure 13A:
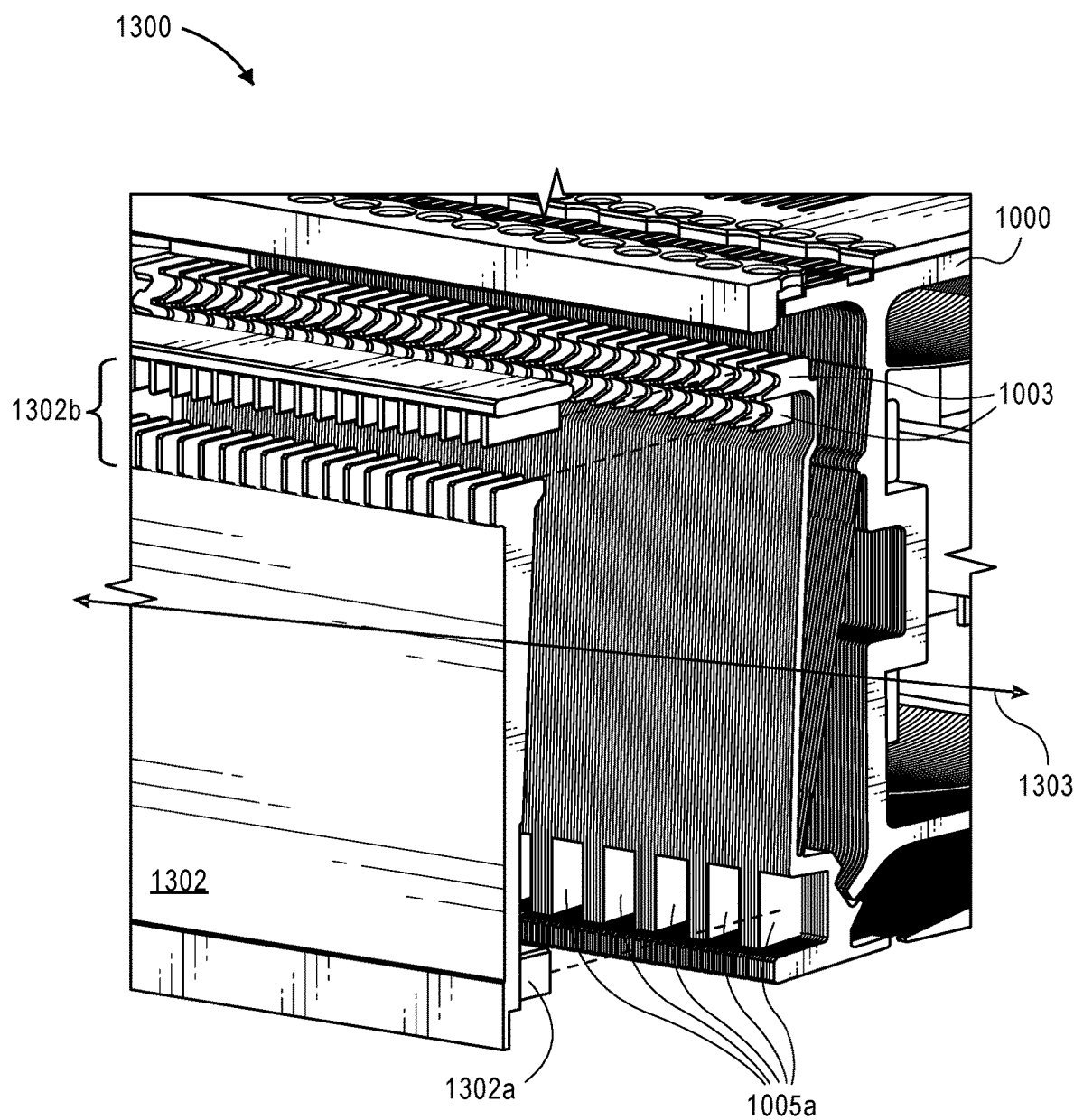
FIG. 13A is an exploded front side perspective view illustrating a portion of a lapping tool assembly, according to an embodiment.
Figure 13B:
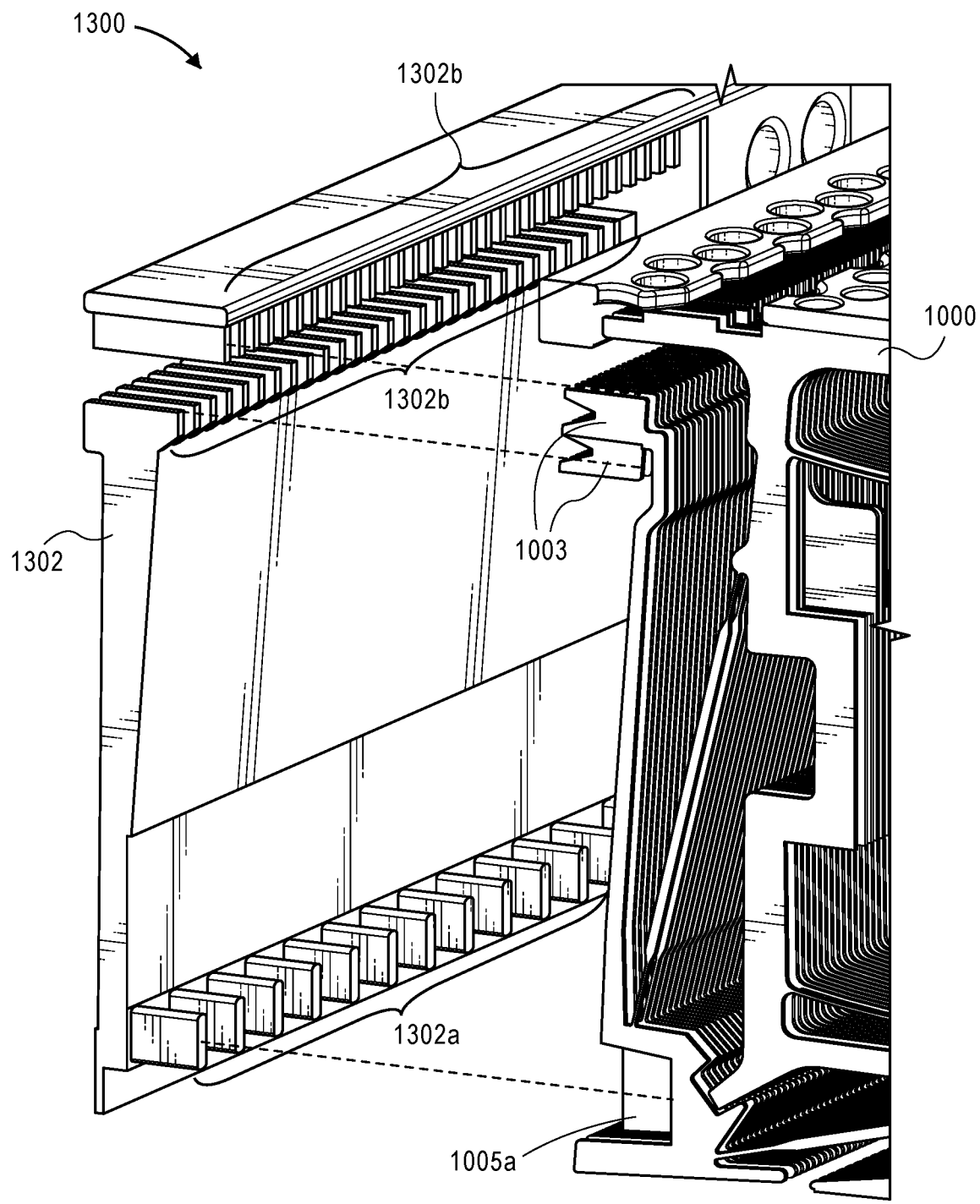
FIG. 13B is an exploded side perspective view illustrating a portion of the lapping tool assembly of FIG. 13A, according to an embodiment.

FIG. 13A is an exploded front side perspective view illustrating a portion of a lapping tool assembly, and FIG. 13B is an exploded side perspective view illustrating a portion of the lapping tool assembly of FIG. 13A, according to an embodiment. Lapping tool assembly 1300 comprises the lapping mount tool 1000 conjoined with or coupled to a mounting plate part 1302 ("mounting plate 1302"), to which a PCB may be mounted according to an embodiment. Mounting plate 1302 comprises a plurality of lower interlocking pins 1302*a* (or a "lower comb"). Each adjacent lower interlocking pin 1302*a*, when engaged with the lapping mount tool 1000, is positioned within a corresponding pocket 1005*a* associated with a group of adjacent angular actuation pins 1005. According to an embodiment, mounting plate 1302 further comprises a plurality of upper interlocking pins 1302*b* or "upper comb"), where each adjacent upper interlocking pin 1302*b*, when engaged with the lapping mount tool 1000, is positioned between corresponding adjacent forks 1003 or group of forks 1003 constituent to angular actuation pins 1005. Hence, engagement of the lower and upper interlocking pins 1302*a*, 1302*b* of the mounting plate 1302 with the lapping mount tool 1000 thereby functions to limit displacement and material stress of the angular actuation pins 1005, primarily in the x-direction (as depicted by arrow 1303 of FIG. 12A), but also in the z-direction resulting from the structural configuration and shape of the pockets 1005*a* and from the interlocking of the upper interlocking pins 1302*a*, 1302*b* with the corresponding comb of forks 1003, as well as to ensure proper alignment with the actuating mechanisms in the case of the upper interlocking pins 1302*a*, 1302*b* interlocking with the corresponding comb of forks 1003. Thus, the angular actuation pins 1005 may be protected from damage (which may affect mount tool accuracy and performance) upon the lapping tool assembly 1300 being dropped in the direction of arrow 1303, generally, and/or experiencing a drop-shock/impact having a force component in the direction of arrow 1303.

While the lower and/or upper pins 1302*a*, 1302*b* of the mounting plate 1302 may be implemented independent of the pins 1202*a* (FIGS. 12A, 12B) of the assembly base 1202 (FIGS. 12A, 12B), note that the pins 1202*a* (FIGS. 12A, 12B) of the assembly base 1202 (FIGS. 12A, 12B) may be implemented in conjunction with the lower and/or upper pins 1302*a*, 1302*b* of the mounting plate 1302, to provide protection against drop-shock/impact damage to both the actuation pins 1007 and the angular actuation pins 1005 of lapping mount tool 1000. Note also that buttressing the actuation pins 1005, 1007 with the corresponding pins 1302*a*, 1302*b*, 1202*a* may further provide support and protection against damage in the y-direction in the event of a drop-shock or other impact event.

Method for Lapping a Row-Bar of Magnetic Read-Write Head Sliders

Figure 14:
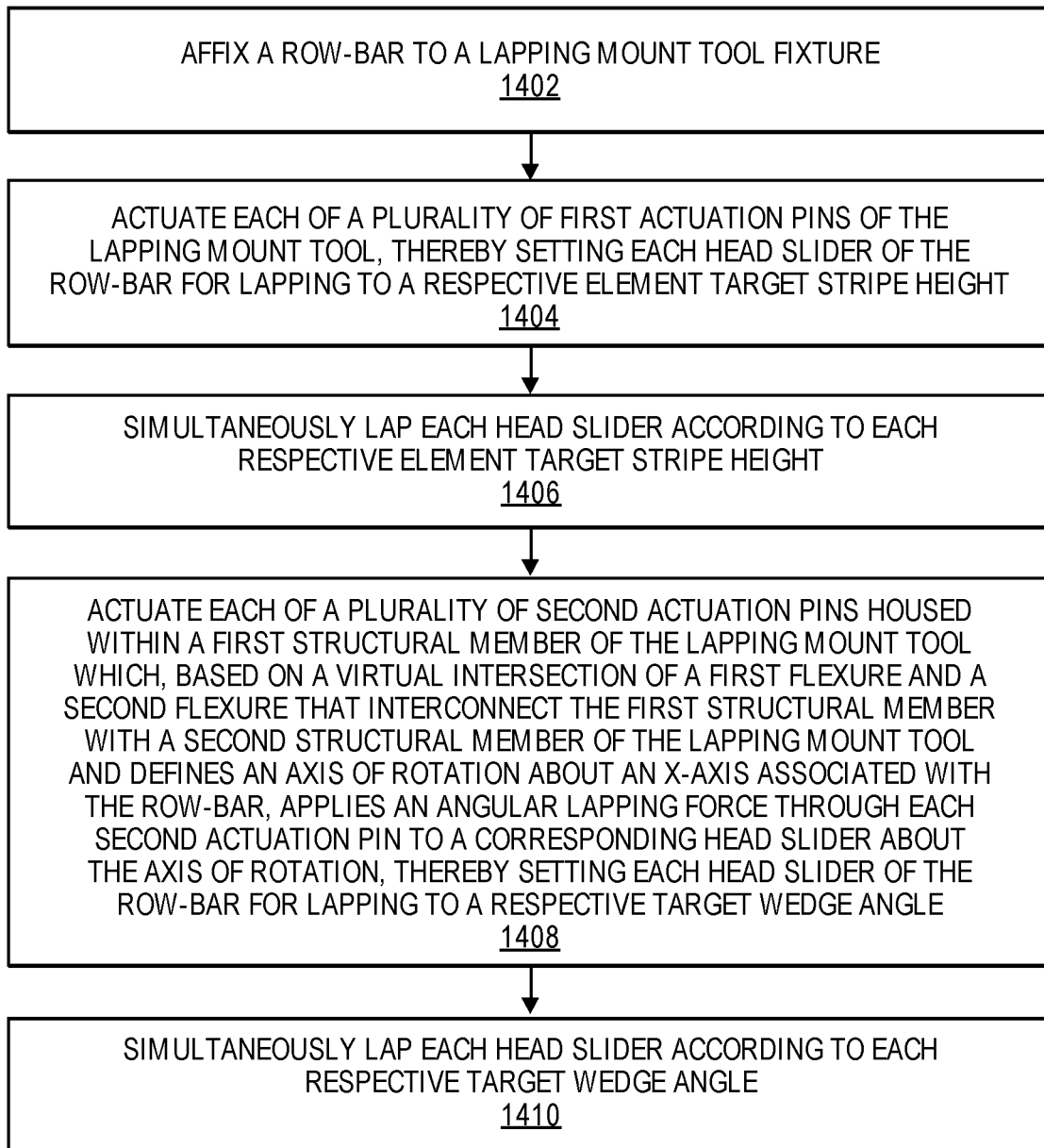
FIG. 14 is a flow diagram illustrating a method for lapping a row-bar of head sliders, according to an embodiment.

FIG. 14 is a flow diagram illustrating a method for lapping a row-bar of head sliders, according to an embodiment. The various embodiments described in reference to FIG. 14 may each be performed using the lapping mount tool 1000 (FIGS. 10A-11) described elsewhere herein. For context and as described, each row-bar has an x-axis along the direction of the row and a y-axis along the direction of a reader-writer offset associated with the head sliders in the row-bar, and each head slider comprises a reader element and a writer element.

At block 1402, a row-bar of magnetic read-write head sliders is affixed to a lapping mount tool fixture. For example, row-bar 206 (FIGS. 5, 6, 7A) is affixed to fixture 1008 (FIGS. 10A-11) of the first structural member 1002 (FIGS. 10A-10C) of the lapping tool 1000 (FIGS. 10A-11), such as via the elastomer 516 (FIGS. 5, 6, 7A), and electrically connected to a PCB mounted to mounting plate 1302 (FIGS. 13A, 13B).

At block 1404, each of a plurality of first actuation pins of the lapping mount tool is actuated thereby setting each head slider of the row-bar for lapping to a respective target stripe height (stripe height may at times referred to as flare point for a writer element). For example, each stripe height actuation pin 1007 (FIGS. 10A-11) is actuated 1104 (FIG. 11) (for non-limiting examples, pneumatically, hydraulically, mechanically, electrically, and the like) to set each head slider 208*a*-208*m* (FIG. 2) of the row-bar 206 for lapping to a respective target reader stripe height 215 (FIG. 2A), which is a dimension relative to the z-axis direction. The manner in which each respective target stripe height is set is consistent with as described herein in reference to FIGS. 10A-11.

Thus, at block 1406, each head slider is simultaneously lapped according to each respective corresponding target stripe height. For example, each head slider 208*a*-208*m* of the row-bar 206 is lapped according to each corresponding target stripe height 215 in response to a respective linear lapping force 1105 (FIG. 11). Recall from FIG. 3 that lapping may be performed on a head slider or a row-bar of head sliders using a lapping fixture 304 and a lapping plate 306, which is commonly diamond-encrusted and/or accompanied by a diamond slurry.

Continuing on with wedge angle lapping if applicable or desired, at block 1408, each of a plurality of second actuation pins of the lapping mount tool is actuated thereby setting each head slider of the row-bar for lapping to a respective target wedge angle. For example, each angular actuation pin 1005 (FIGS. 10A-11) is actuated 1102 (FIG. 11) (for non-limiting examples, pneumatically, hydraulically, mechanically, electrically, and the like) to set each head slider 208*a*-208*m* of the row-bar 206 for lapping to a respective target wedge angle 303 (FIG. 3), which is an angle relative to the y-axis direction. The manner in which each respective target wedge angle is set is consistent with as described herein in reference to FIGS. 10A-11. Recall that each angular actuation pin 1005 is housed within the first structural member 1002 (FIGS. 10A-10C) of the lapping mount tool 1000 and, based on the virtual intersection of the first flexure 1012a (FIGS. 10A, 10C, 11) and the second flexure 1012b (FIGS. 10A, 10C, 11) that interconnect the first structural member 1002 with the second structural member 1006, where such virtual intersection defines the axis of rotation of the angular actuation pins 1005 (and thus the row-bar 206) about the x-axis, applies an angular lapping force 1103 (FIG. 11) through each angular actuation pin 1005 to a corresponding head slider 208a-208m about the defined axis of rotation.

Thus, at block 1410, each head slider is simultaneously lapped according to each respective corresponding target wedge angle. For example, each head slider 208a-208m of the row-bar 206 is lapped according to each corresponding target wedge angle 303. Recall from FIG. 3 that lapping may be performed on a head slider or a row-bar of head sliders using a lapping fixture 304 and a lapping plate 306, which is commonly diamond-encrusted and/or accompanied by a diamond slurry. According to an embodiment, actuating 1102 the second actuation pins at block 1408 is performed after actuating 1104 the first actuation pins at block 1404. However, this order of activities may vary from implementation to implementation and, therefore, may be reversed if desired.

Lapping Tool Assembly with Tilt Interposer

Figure 15A:
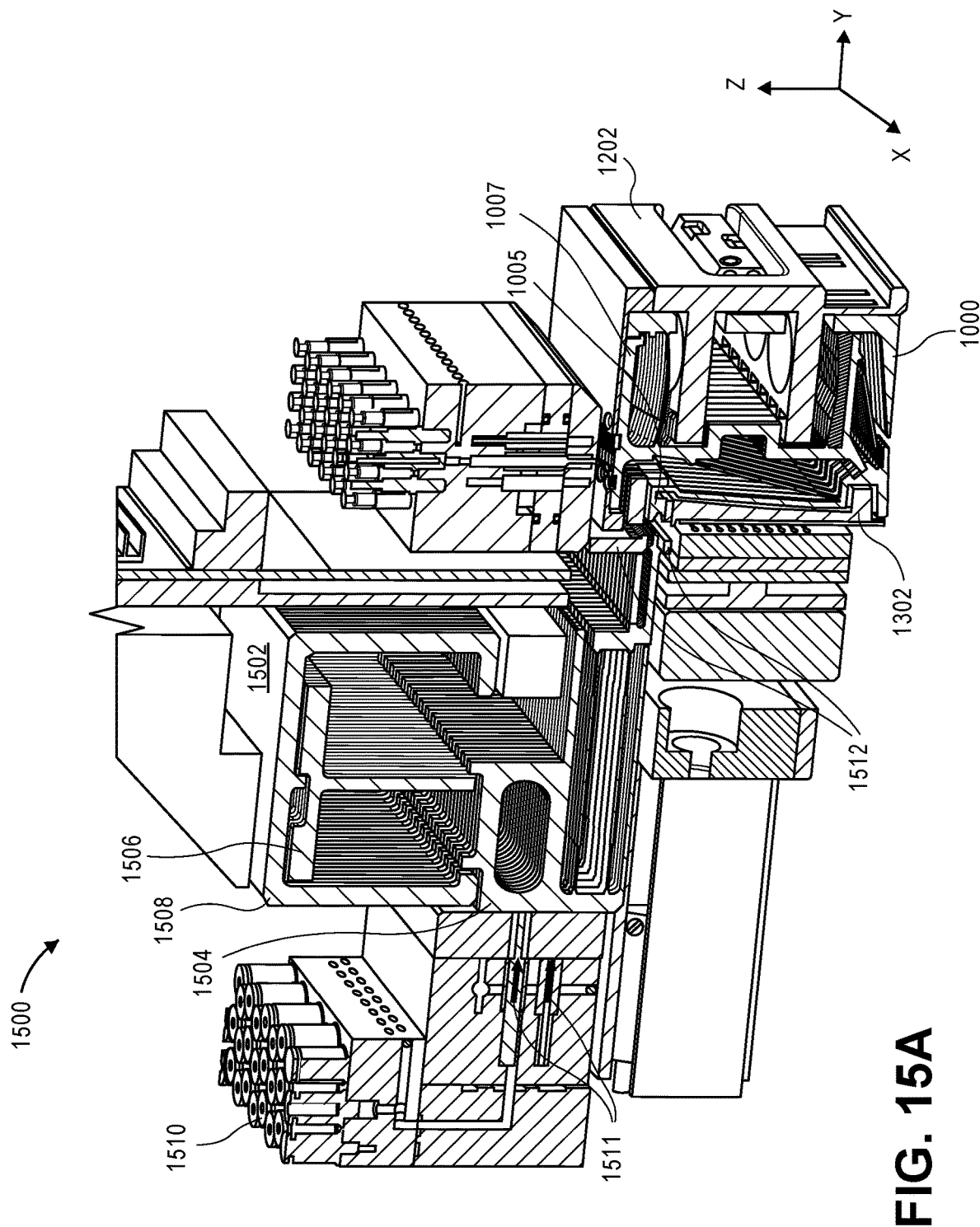
FIG. 15A is a side perspective view illustrating a lapping tool assembly including an actuator tilt interposer, according to an embodiment.
Figure 15B:
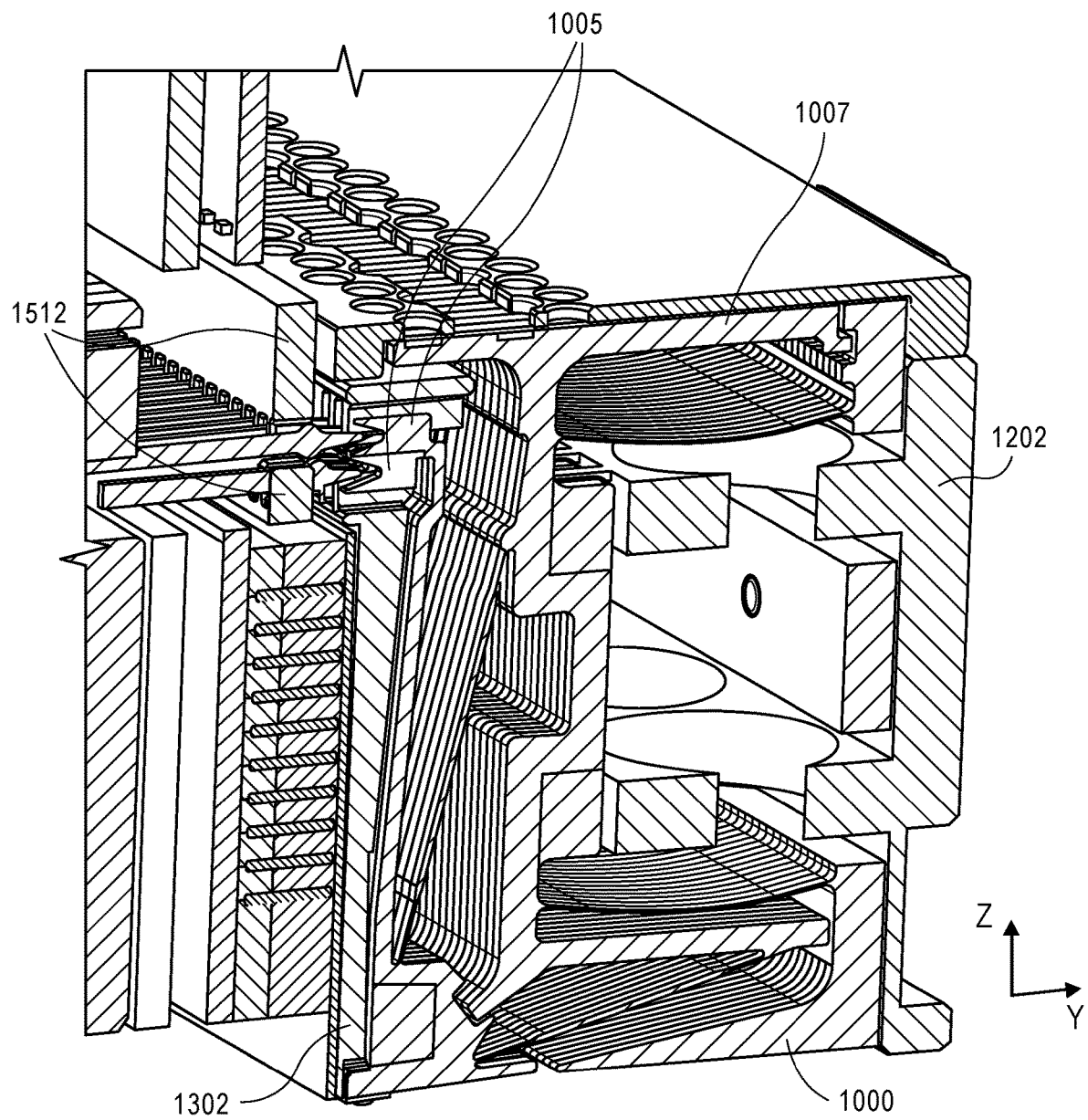
FIG. 15B is a side perspective view illustrating a portion of the lapping tool assembly of FIG. 15A, according to an embodiment.
Figure 16:
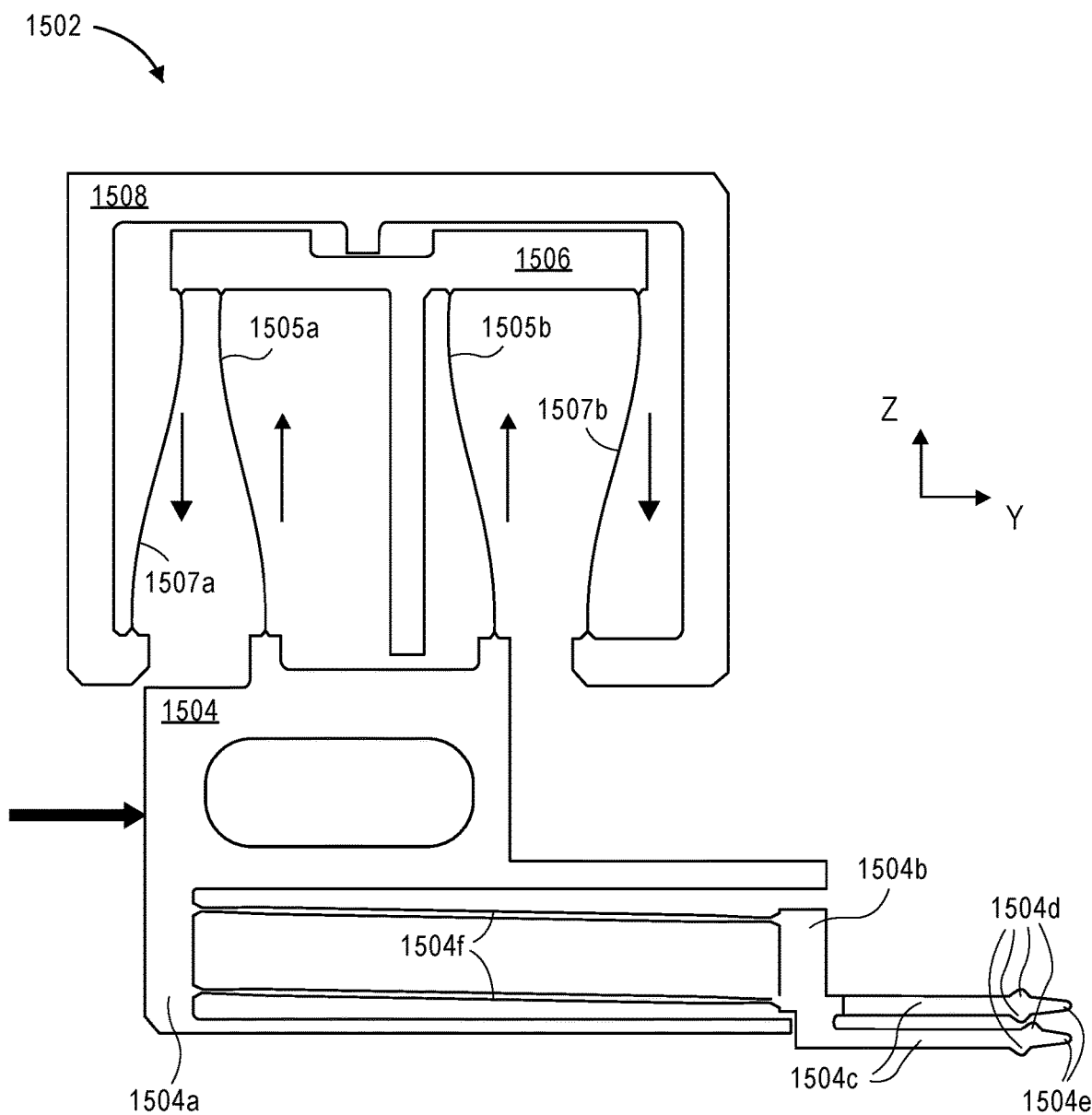
FIG. 16 is a cross-sectional side view of the actuator tilt interposer of FIG. 15A, according to an embodiment.
Figure 17:
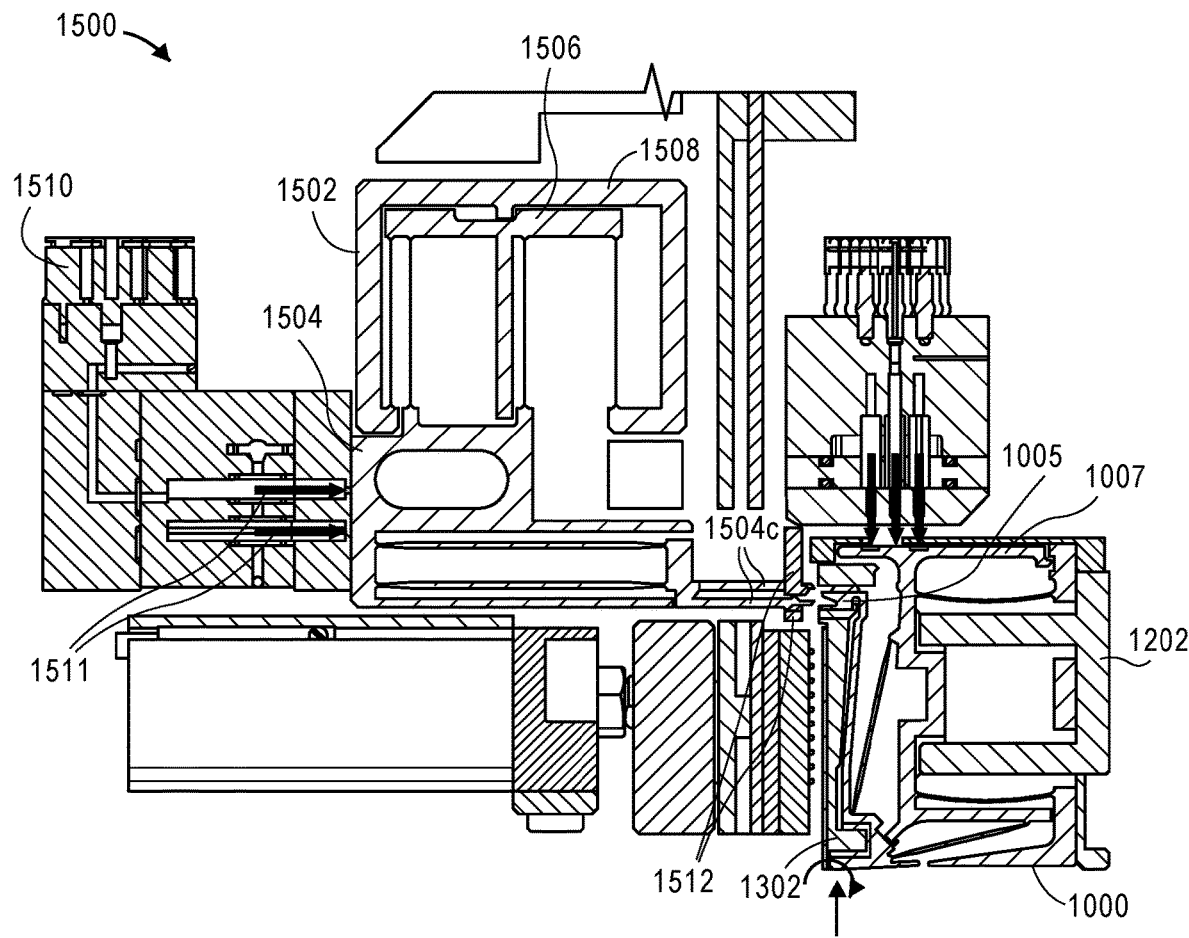
FIG. 17 is a cross-sectional side view of the lapping tool assembly of FIG. 15A, according to an embodiment.

FIG. 15A is a side perspective view illustrating a lapping tool assembly including a tilt interposer, and FIG. 15B is a side perspective view illustrating a portion of the lapping tool assembly of FIG. 15A, according to embodiments. FIG. 16 is a cross-sectional side view of the tilt interposer of FIG. 15A, and FIG. 17 is a cross-sectional side view of the lapping tool assembly of FIG. 15A, according to embodiments. Lapping tool assembly 1500 is an assembly comprising the lapping mount tool 1000 (see FIGS. 10A-11), a plurality of actuators 1510 (for a non-limiting example, air bearing actuators) for actuating the angular actuation pins 1005 of the mount tool 1000, and an actuation interposer 1502 ("interposer 1502") interposed between the actuators 1510 and the mount tool 1000.

The interposer 1502 structure comprises a first element comprising a plurality of interposer structures 1504 ("interposer pins 1504" or, collectively, "first element 1504"), each reactively coupled with a corresponding actuator 1510. Each interposer pin 1504 is configured to receive a respective translational force 1511 from the corresponding actuator 1510 for transmission or application to a corresponding angular actuation pin 1005 of mount tool 1000. The interposer 1502 further comprises a second element, a T-shaped structure 1506 ("T-structure 1506") that is coupled (a) to the first element 1504 via a first flexure 1505a and a second flexure 1505b and (b) to a fixed frame or housing 1508 via a third flexure 1507a and a fourth flexure 1507b. Refer to FIG. 16 for an illustration of the foregoing flexure system (flexures not shown in FIG. 15A to maintain clarity), which may be characterized as a zero z-axis (vertical) shift flexure system.

In view of the first element 1504 "hanging" from the T-structure 1506 by the flexible first and second flexures 1505a, 1505b, when actuated in the horizontal (y-axis) direction, the first element 1504 has a natural tendency to swing or arc upward in a counterclockwise direction, e.g., through bending of the first and second flexures 1505a, 1505b. Any upward motion (z-axis) of the first element 1504 is undesirable because a simple linear translation of the first element 1504 in the y-direction is preferred, in order to properly engage with and to translate the actuation forces substantially normal to the receiving angular actuation pins 1005 of the mount tool 1000. Thus, according to an embodiment, the first flexure 1505a, the second flexure 1505b, the third flexure 1507a, and the fourth flexure 1507b are configured (e.g., as depicted in FIG. 16) such that the tendency of the first element to swing upward in a counterclockwise direction is offset by the T-structure 1506 swinging downward in a clockwise direction through bending of the third and fourth flexures 1507a, 1507b. Consequently, the interposer pins 1504 constituent to the first element are allowed or forced to translate substantially linearly in the y-direction only.

With reference to FIG. 16, according to an embodiment the first element 1504 further comprises an interposer-to-mount tool z-axis decoupler or decoupling flexure system, wherein each interposer pin 1504 of the first element of the interposer 1502 comprises (a) a proximal end 1504a proximal to the actuators 1510, (b) a distal end 1504c including a tip 1504e engageable with the corresponding angular actuation pin 1505 of the mount tool 1000, and (c) an intermediate structure 1504b between the proximal end 1504a and the distal end 1504c, from which the distal end 1504c extends. The z-axis decoupling flexure system embodied in the first element 1504 further comprises a group of one or more first decoupler flexures 1504f and a group of one or more second decoupler flexures 1504f, which couple the proximal end 1504a to the intermediate structure 1504b. The structural configuration of the first and second decoupler flexures 1504f may vary from implementation to implementation. For non-limiting examples, each of the first and the second decoupler flexures 1504f may comprise a single flexure 1504f corresponding to each interposer pin 1504 and spanning between the proximal end 1504a to the intermediate structure 1504b, or each may comprise a monolithic flexure 1504f spanning the proximal end 1504a to the intermediate structure 1504b.

Implementation of the first and second flexures 1504f provides a reduced or relatively low bending stiffness for this portion of the first element 1504, thereby allowing each distal end 1504c to follow the corresponding engaged angular actuation pin 1005 of the mount tool 1000 while substantially decoupling the influence of forces from each distal end 1504c upon the mount tool 1000. More specifically, recall that the angular actuation pins 1005 and the stripe height actuation pins 1007 (which move in the z-axis direction for lapping) of the mount tool 1000 are coupled via the first flexure 1012a and the second flexure 1012b of the mount tool 1000 (see, e.g., FIGS. 10A, 10C, 11) and, therefore, movement of one type of actuation pin may influence the other type of actuation pin. However, the foregoing z-axis decoupler flexure system operates to substantially decouple the application of y-axis direction engagement forces from the interposer pins 1504 (e.g., due to the direct engagement of the respective tip 1504e of each interposer pins 1504 with the angular actuation pins 1005) to the stripe height actuation pins 1007, thereby inhibiting or reducing or eliminating such y-axis forces from affecting the stripe height actuation pins 1007 in the z-axis direction.

Figure 18:
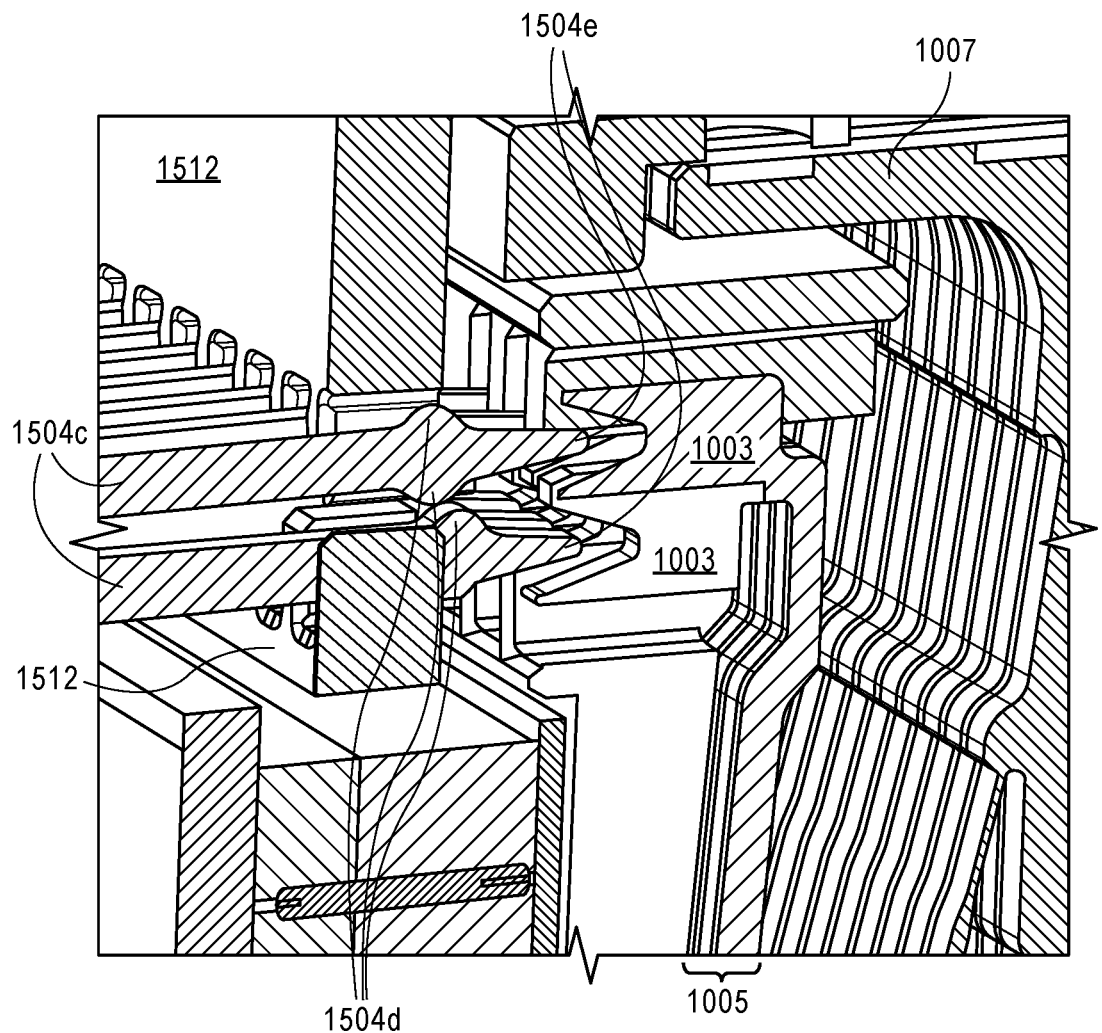
FIG. 18 is a side perspective view of a pre-aligner of the actuator tilt interposer of FIG. 15A, according to an embodiment.

FIG. 18 is a side perspective view of a pre-aligner of the actuator tilt interposer of FIG. 15A, according to an embodiment. With reference now to FIG. 16 and FIG. 18, according to an embodiment each interposer pin 1504 is depicted as comprising an alignment bump structure/feature 1504*d* ("alignment bump 1504*d*") that helps aligns the corresponding distal end 1504*c* of the interposer pin 1504 with the corresponding angular actuation pin 1005 of the mount tool 1000. Stated otherwise, each alignment bump 1504*d* substantially centers the corresponding distal end tip 1504*e* of an interposer pin 1504 within a fork 1003 of a corresponding angular actuation pin 1005 when the interposer pin 1504 is engaged with the angular actuation pin 1005.

With reference to FIGS. 15A, 15B, 17, and 18, the lapping tool assembly 1500 further comprises a pre-aligner comb 1512 that positions each interposer pin 1504 within a certain z-axis (vertical) tolerance range. That is, the pre-aligner comb 1512 operates to constrain the interposer pins 1504 in the z-axis direction. Furthermore, once the interposer pins 1504 are properly and securely engaged with the corresponding angular action pins 1005 of the mount tool 1000, each alignment bump 1504*d* of the interposer pins 1504 is positioned between the pre-aligner comb 1512 and the distal end tip 1504*e* of the interposer pin 1504. Hence, each interposer pin 1504 is free to move in the z-axis direction, once each alignment bump 1504*d* is located outside of the pre-aligner comb 1512, along with the respective engaged angular actuation pin 1005 of the mount tool 1000.

Figure 19:
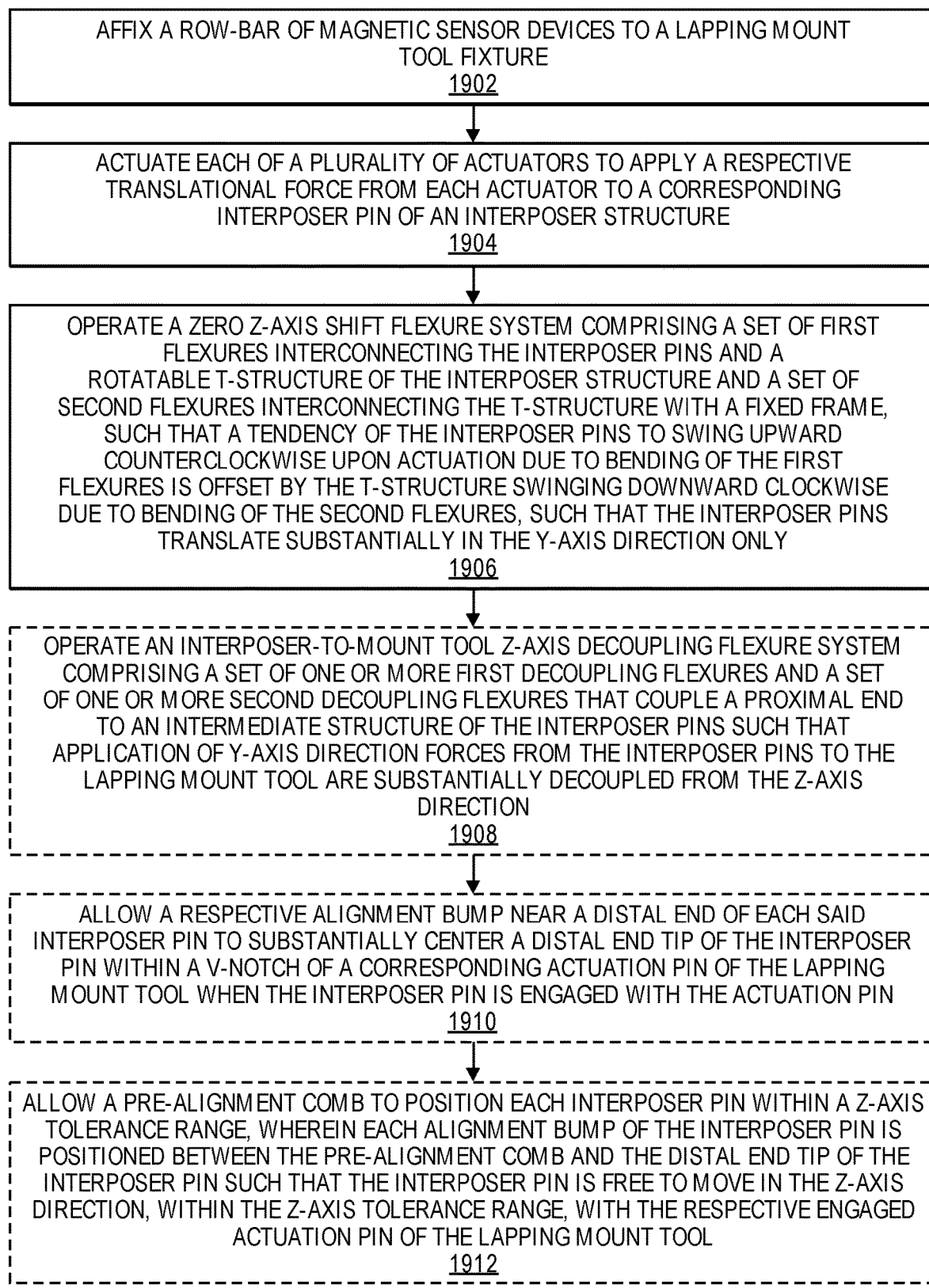
FIG. 19 is a flow diagram illustrating a method for applying actuation forces to a lapping mount tool for lapping a row-bar of magnetic sensor devices, according to an embodiment.

Method for Applying Actuation Forces to a Lapping Mount Tool for Lapping A Row-Bar of Magnetic Sensor Devices FIG. 19 is a flow diagram illustrating a method for applying actuation forces to a lapping mount tool for lapping a row-bar of magnetic sensor devices, according to an embodiment, where the row-bar has an x-axis along the direction of the row and a y-axis along the direction of the width of the row-bar. Magnetic sensor devices may include, for example, any of a myriad of forms of magnetic read-write heads, or magnetic readers alone, or other types of magnetic sensors, generally.

At block 1902, the row-bar is affixed to a lapping mount tool fixture. For example, row-bar 206 (FIGS. 5, 6, 7A) is affixed to fixture 1008 (FIGS. 10A-11) of the first structural member 1002 (FIGS. 10A-10C) of the lapping tool 1000 (FIGS. 10A-11), such as via the elastomer 516 (FIGS. 5, 6, 7A).

At block 1904, each of a plurality of actuators is actuated to apply a respective translational force from each actuator to a corresponding interposer pin of an interposer structure. For example, each of the actuators 1510 (FIGS. 15A, 17) of actuator assembly 1500 (FIGS. 15A, 15B, 16, 17) is actuated, to apply a respective translational force 1511 (FIGS. 15A, 17) to a corresponding interposer pin 1504 (FIGS. 15A, 16, 17) of the interposer structure 1502 (FIGS. 15A, 16, 17).

At block 1906, a zero z-axis shift flexure system is operated, where such a flexure system comprises (a) a set of first flexures interconnecting the interposer pins and a rotatable T-structure of the interposer structure and (b) a set of second flexures interconnecting the T-structure with a fixed frame, such that a tendency of the interposer pins to swing upward counterclockwise upon actuation, due to bending of the first flexures, is offset by the T-structure swinging downward clockwise, due to bending of the second flexures, such that the interposer pins translate substantially in the y-direction only. For example, the mechanism of interposer structure 1502 (FIG. 16) is operated, where such mechanism comprises (a) the set of first flexures 1507*a* interconnecting the interposer pins 1504 and the rotatable T-structure 1506 ((FIGS. 15A, 16, 17) of the interposer structure 1502 and (b) the set of second flexures 1507*b* interconnecting the T-structure 1506 with a fixed frame 1508 (FIGS. 15A, 16, 17), such that a tendency of the interposer pins 1504 to swing upward counterclockwise upon actuation, due to bending of the first flexures 1507*a*, is offset by the T-structure 1506 swinging downward clockwise, due to bending of the second flexures 1507*b*, such that the interposer pins 1504 translate substantially in the y-direction only.

According to an embodiment, at optional block 1908, an interposer-to-mount tool z-axis decoupling flexure system is operated, where such a flexure system comprises a set of one or more first decoupling flexures and a set of one or more second decoupling flexures that couple each proximal end to an intermediate structure of the interposer pins, such that the application of the y-direction forces from the interposer pins to the lapping mount tool are substantially decoupled from the z-axis direction. For example, an interposer-to-mount tool z-axis decoupling flexure system is operated, where such a flexure system comprises a set of one or more first decoupling flexures 1504*f* (FIG. 16) and a set of one or more second decoupling flexures 1504*f* (FIG. 16) that couple each proximal end 1504*a* (FIG. 16) to an intermediate structure 1504*b* (FIG. 16) of the interposer pins 1504, such that the application of the y-direction forces from the interposer pins 1504 to the lapping mount tool 1000 are substantially decoupled from the z-axis direction.

According to an embodiment, at optional block 1910, a respective alignment bump near the distal end of each interposer pin is allowed to substantially center a distal end tip of the interposer pin within a V-notch of a corresponding actuation pin of the lapping mount tool in situations in which the interposer pin is engaged with the actuation pin. For example, the respective alignment bump 1504*d* (FIGS. 16, 18) near the distal end 1504*c* (FIG. 16) of each interposer pin 1504 is allowed to substantially center the distal end tip 1504*e* (FIGS. 16, 18) of the interposer pin within the fork 1003 (FIGS. 10A-10C, 18) of a corresponding angular actuation pin 1005 (FIGS. 10A-10C, 15A, 15B, 17, 18) of the lapping mount tool 1000 in situations in which the interposer pin 1504 is engaged with the angular actuation pin 1005.

According to an embodiment, at optional block 1912, a pre-alignment comb is allowed to position each interposer pin within a z-axis tolerance range, where each alignment bump of the interposer pin is positioned between the pre-alignment comb and the distal end tip of the interposer pin such that the interposer pin is free to move in the z-axis direction, with the z-axis tolerance range, with the respective engaged actuation pin of the lapping mount tool. For example, the pre-alignment comb 1512 (FIGS. 15A, 15B, 17, 18) is allowed to position each interposer pin 1504 within a z-axis tolerance range, where each alignment bump 1504*d* of the interposer pin 1504 is positioned between the pre-alignment comb 1512 and the distal end tip 1504*e* of the interposer pin 1504 such that the interposer pin 1504 is free to move in the z-axis direction, within the z-axis tolerance range, with the respective engaged angular actuation pin 1005 of the lapping mount tool 1000.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A lapping tool assembly comprising:
    a mount tool comprising:
        a rotatable first structural member housing a plurality of angular actuation pins each positioned to apply an angular lapping force to a corresponding head slider of a row-bar of magnetic read-write head sliders, said first structural member comprising a fixture for holding said row-bar, and
        a second structural member coupled with said first structural member via a first flexure and a second flexure, said second structural member housing a plurality of stripe height actuation pins each positioned to apply a lapping force to a corresponding head slider of said row-bar; and
    an interposer structure interposed between a plurality of actuators and said mount tool, said interposer comprising:
        a first element comprising a plurality of interposer pins reactively coupled with said plurality of actuators such that each said interposer pin is configured to receive a respective translational force from a corresponding said actuator for transmission of said respective translational force to a corresponding said angular actuation pin of said mount tool, and
        a second element coupled to said first element via a first flexure and a second flexure, and coupled to a fixed housing via a third flexure and a fourth flexure.

2. The lapping tool assembly of claim 1, wherein said first, second, third, and fourth flexures are configured such that:
    upon said first element receiving said translational forces in a y-direction from said actuators, a natural tendency of said first element to swing upward counterclockwise due to bending of said first and second flexures is offset by said second element swinging downward clockwise due to bending of said third and fourth flexures, such that said first element translates substantially linearly only in the y-direction.

3. The lapping tool assembly of claim 1, wherein:
    said plurality of stripe height actuation pins, when actuated, translate substantially in a z-direction;
    said interposer pins of said first element of said interposer structure each comprises a proximal end proximal to said actuators, a distal end including a distal end tip engageable with said corresponding angular actuation pin of said mount tool, and an intermediate structure between said proximal end and said distal end and from which said distal end extends; and
    said first element further comprises a decoupler flexure system comprising a group of one or more first decoupler flexures and a group of one or more second decoupler flexures coupling said proximal end to said intermediate structure of said interposer pins to substantially decouple application of y-direction engagement forces from said interposer pins to said stripe height actuation pins from affecting said stripe height actuation pins of said mount tool in said z-direction.

4. The lapping tool assembly of claim 1, wherein:
    said interposer pins of said first element of said interposer structure each comprises a proximal end proximal to said actuators, a distal end tip engageable with said corresponding angular actuation pin of said mount tool, and an intermediate structure between said proximal end and said distal end and from which said distal end extends; and
    said distal end of each said interposer pin comprises an alignment bump that substantially centers said distal end tip of said interposer pin within a v-notch of said corresponding angular actuation pin when said interposer pin is engaged with said angular actuation pin.

5. The lapping tool assembly of claim 4, further comprising:
    a pre-aligner comb that positions each interposer pin within a vertical tolerance range;
    wherein each said alignment bump of said interposer pin is positioned between said pre-aligner comb and said distal end tip of said interposer pin such that said interposer pin is free to move in the z-direction with the respective engaged angular actuation pin of the mount tool.

6. A lapping tool actuation interposer comprising:
    a first element comprising a plurality of interposer pins reactively coupled with a plurality of actuators such that each said interposer pin is configured to receive a respective translational force from a corresponding said actuator for transmission of said respective translational force to a corresponding lapping mount tool angular actuation pin; and
    a second element coupled to said first element via a first flexure and a second flexure, and coupled to a fixed frame via a third flexure and a fourth flexure.

7. The actuation interposer of claim 6, wherein said first, second, third, and fourth flexures are substantially parallel in a static state and are configured such that:
    upon said first element receiving said translational forces in a y-direction from said actuators, a natural tendency of said first element to swing upward counterclockwise due to bending of said first and second flexures is offset by said second element swinging downward clockwise due to bending of said third and fourth flexures, such that said first element translates substantially linearly only in the y-direction.

8. The actuation interposer of claim 6, wherein:
    said lapping mount tool further comprises a plurality of stripe height actuation pins which when actuated translate substantially in a z-direction, and said stripe height actuation pins are mechanically coupled to said angular actuation pins such that upon said first element transmitting said translational forces in a y-direction to said angular actuation pins, said angular actuation pins rotate and tend to affect said stripe height actuation pins in said z-direction;

said interposer pins of said first element each comprises a proximal end proximal to said actuators, a distal end including a distal end tip engageable with said corresponding angular actuation pin of said mount tool, and an intermediate structure positioned between said proximal end and said distal end and from which said distal end extends; and said first element further comprises a decoupler flexure system comprising a group of one or more first decoupler flexures and a group of one or more second decoupler flexures coupling said proximal end to said intermediate structure of said interposer pins to substantially decouple application of y-direction engagement forces from said interposer pins to said stripe height actuation pins from affecting said stripe height actuation pins of said mount tool in said z-direction.

9. The actuation interposer of claim 6, wherein:

said interposer pins of said first element each comprises a proximal end proximal to said actuators, a distal end including a distal end tip engageable with said corresponding angular actuation pin of said mount tool, and an intermediate structure between said proximal end and said distal end and from which said distal end extends; and said distal end of each said interposer pin comprises an alignment bump that aligns said interposer pin in said z-direction with a fork of said corresponding angular actuation pin when said interposer pin is engaged with said angular actuation pin.

10. A method for applying actuation forces to a lapping mount tool for lapping a row-bar of magnetic sensor devices, wherein said row-bar has an x-axis along the direction of the row and a y-axis along the direction of the width of said row-bar, the method comprising:

affixing said row-bar to a lapping mount tool fixture;

actuating each of a plurality of actuators to apply a respective translational force from each said actuator to a corresponding interposer pin of an interposer structure;

operating a zero z-axis shift flexure system comprising a set of first flexures interconnecting said interposer pins and a rotatable T-structure of said interposer structure and a set of second flexures interconnecting said T-structure with a fixed frame, such that a tendency of said interposer pins to swing upward counterclockwise upon actuation due to bending of said first flexures is offset by said T-structure swinging downward clockwise due to bending of said second flexures, such that said interposer pins translate substantially in the y-axis direction only.

11. The method of claim 10, wherein said interposer pins each comprises a proximal end proximal to said actuators, a distal end including a distal end tip engageable with a corresponding angular actuation pin of a lapping mount tool, and an intermediate structure between said proximal end and said distal end and from which said distal end extends, the method further comprising:

operating an interposer-to-mount tool z-axis decoupling flexure system comprising a set of one or more first decoupling flexures and a set of one or more second decoupling flexures that couple said proximal end to said intermediate structure of said interposer pins such that application of y-axis direction forces from said interposer pins to said lapping mount tool are substantially decoupled from said z-axis direction.

12. The method of claim 10, wherein said interposer pins each comprises a proximal end proximal to said actuators, a distal end including a distal end tip engageable with a corresponding angular actuation pin of a lapping mount tool, and an intermediate structure between said proximal end and said distal end and from which said distal end extends, the method further comprising:

allowing a respective alignment bump near said said distal end of each said interposer pin to substantially center said distal end tip of said interposer pin within a v-notch of a corresponding actuation pin of said lapping mount tool when said interposer pin is engaged with said actuation pin.

13. The method of claim 12, further comprising:

allowing a pre-alignment comb to position each interposer pin within a z-axis tolerance range;

wherein each said alignment bump of said interposer pin is positioned between said pre-alignment comb and said distal end tip of said interposer pin such that said interposer pin is free to move in the z-axis direction, within said z-axis tolerance range, with the respective engaged actuation pin of the lapping mount tool.

14. An actuator-to-lapping tool interposer comprising:

means for applying a zero z-axis shift such that a tendency of interposer pins, housed within said interposer, to swing upward counterclockwise upon y-axis actuation is offset by a T-structure, housed within said interposer, swinging downward clockwise, such that said interposer pins translate substantially in the y-axis direction only.

15. The actuator-to-lapping tool interposer of claim 14, further comprising:

means for applying a z-axis decoupling mechanism such that application of y-axis direction forces from said interposer pins to a lapping mount tool are substantially decoupled from said z-axis direction.

* * * * *